US010820649B2

(12) United States Patent
Barnet et al.

(10) Patent No.: US 10,820,649 B2
(45) Date of Patent: Nov. 3, 2020

(54) ORGANIZED ASSEMBLY INSTRUCTION PRINTING AND REFERENCING

(71) Applicant: Amazon Technologies, Inc., Seattle, WA (US)

(72) Inventors: Aaron Takayanagi Barnet, Seattle, WA (US); Javier Govea Mata, Seattle, WA (US); Nancy Yi Liang, Seattle, WA (US); Rouzbeh Safavi Aminpour, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 569 days.

(21) Appl. No.: 15/069,867

(22) Filed: Mar. 14, 2016

(65) Prior Publication Data

US 2017/0258164 A1    Sep. 14, 2017

(51) Int. Cl.
*A41H 3/00* (2006.01)
*G05B 15/02* (2006.01)
*G06F 3/12* (2006.01)

(52) U.S. Cl.
CPC ............ *A41H 3/007* (2013.01); *G05B 15/02* (2013.01); *G06F 3/125* (2013.01); *G06F 3/1208* (2013.01); *G06F 3/1275* (2013.01); *G06F 3/1282* (2013.01)

(58) Field of Classification Search
CPC ..... A41H 3/007; G06F 3/1282; G06F 3/1275; G06F 3/1208; G06F 3/125; G05B 15/02
See application file for complete search history.

(56) References Cited

U.S. PATENT DOCUMENTS

| 4,178,820 A | 12/1979 | Gerber |
| 5,132,505 A | 7/1992 | Zonneveld |

(Continued)

FOREIGN PATENT DOCUMENTS

WO    2016/033367    3/2016

OTHER PUBLICATIONS

PCT Patent Application PCT/US17/016802 filed on Feb. 7, 2017, Notification of Transmittal of the International Search Report and the Written Opinion of the International Searching Authority, or the Declaration dated May 10, 2017.

(Continued)

*Primary Examiner* — Robert E Fennema
*Assistant Examiner* — Shon G Foley
(74) *Attorney, Agent, or Firm* — Eversheds Sutherland (US) LLP

(57) ABSTRACT

The incorporation of digitally-printed assembly instructions and notations into textile product assembly processes is described. In one embodiment, an order to purchase a textile product having a number of panels is received. The panels are arranged and placed into a template for printing on a textile printer. Seams among the panels are identified and, with reference to the seams, assembly tasks are compiled to assemble the textile product. The assembly tasks are ordered according to at least one assembly factor directed to efficiency, quality, or other factors. The assembly tasks are associated with a set of assembly notations according to an assembly notation syntax. The assembly notations are incorporated into the template for printing, and the textile printer is instructed to print the panels along with the assembly notations. Sewing workers can refer to the assembly notations to determine how the textile product should be assembled using the panels.

19 Claims, 10 Drawing Sheets

(56) References Cited

U.S. PATENT DOCUMENTS

| | | |
|---|---|---|
| 5,172,326 A | 12/1992 | Campbell, Jr. et al. |
| 5,254,833 A | 10/1993 | Okiyama |
| 5,333,111 A | 7/1994 | Chaiken |
| 5,418,711 A | 5/1995 | Pomerleau |
| 5,709,506 A | 1/1998 | Beard et al. |
| 5,791,215 A | 8/1998 | Morrison et al. |
| 5,806,390 A | 9/1998 | Pomerleau |
| 5,867,392 A | 2/1999 | Bousquet |
| 5,975,743 A | 11/1999 | Bercaits |
| 6,028,320 A | 2/2000 | Uhling |
| 6,173,211 B1 | 1/2001 | Williams et al. |
| 6,349,241 B1 | 2/2002 | Peron et al. |
| 6,499,513 B1* | 12/2002 | Couch .................. A41H 3/08 112/470.03 |
| 6,502,489 B2 | 1/2003 | Gerent |
| 6,520,057 B1 | 2/2003 | Steadman |
| 6,807,289 B2 | 10/2004 | Zink |
| 6,836,694 B1 | 12/2004 | Heinz |
| 7,003,370 B2 | 2/2006 | Rapoza |
| 8,428,767 B2 | 4/2013 | Tremoureux et al. |
| 8,731,703 B1 | 5/2014 | Lehrer et al. |
| 8,838,482 B2 | 9/2014 | Schindler et al. |
| 9,332,251 B2* | 5/2016 | Haisty .................. H04N 9/3147 |
| 2002/0018235 A1* | 2/2002 | Ryan .................. G06Q 10/06 358/1.15 |
| 2004/0153195 A1* | 8/2004 | Watanabe ............ A41H 1/10 700/132 |
| 2007/0107572 A1 | 5/2007 | Pommier |
| 2009/0251721 A1* | 10/2009 | Knodt .................. G06Q 10/06 358/1.15 |
| 2013/0144424 A1 | 6/2013 | Jarbouai |
| 2013/0261785 A1 | 10/2013 | Crary et al. |
| 2014/0277663 A1* | 9/2014 | Gupta .................. G06F 17/50 700/98 |
| 2014/0277683 A1 | 9/2014 | Gupta et al. |
| 2015/0066189 A1 | 3/2015 | Mulligan et al. |
| 2015/0339853 A1* | 11/2015 | Wolper ................ G06T 17/00 345/423 |

OTHER PUBLICATIONS

PCT Patent Application PCT/US17/020334 filed on Mar. 2, 2017, Notification of Transmittal of the International Search Report and the Written Opinion of the International Searching Authority, or the Declaration dated Jun. 8, 2017.

U.S. Appl. No. 15/069,855, filed Mar. 14, 2016, Non-Final Office Action dated May 19, 2017.

U.S. Appl. No. 14/970,840, filed Dec. 16, 2015, Notice of Allowance dated Jun. 2, 2017.

U.S. Appl. No. 14/970,840, filed Dec. 16, 2015, Final Office Action dated Feb. 24, 2017.

U.S. Appl. No. 14/970,840, filed Dec. 16, 2015, Response to Non-Final Office Action filed Nov. 14, 2016.

U.S. Appl. No. 14/970,874, filed Dec. 16, 2015, Response to Non-Final Office Action filed Nov. 9, 2016.

U.S. Appl. No. 14/970,840, filed Dec. 16, 2015, Office Action dated Aug. 16, 2016.

U.S. Appl. No. 14/970,874, filed Dec. 16, 2015, Office Action dated Aug. 11, 2016.

* cited by examiner

FIG. 3

TECH PACK

| DATE | **** | DESIGNER | SENIOR DSNR | TECH DSNR | DIRECTOR |
|---|---|---|---|---|---|
| DELIVERY | **** | | | | |
| VENDOR | **** | | | | |

SIZE SPECIFICATION

| SIZE | 95 | 100 | 105 |
|---|---|---|---|
| CHEST | 122 | 128 | 134 |
| WAIST | * | * | * |
| BOTTOM | 118 | 124 | 130 |
| SLEEVE LENGTH | 63 | 64 | 65 |
| BACK LENGTH | 74 | 76 | 78 |
| BICEPS (1/2-STRAIGHT) | 28 | 29 | 29 |
| CUFFS(1/2) | 15 | 15 | 16 |
| NECK WIDTH (Bottom/Up) | 57/56.5 | 58.5/58 | 60/59.5 |
| NECK HEIGHT | 8.5/9 | 8.5/9 | 8.5/9 |

ASSORTMENT

| COLOR \ SIZE | 90 | 95 | 100 | 105 | 110 | TOTAL |
|---|---|---|---|---|---|---|
| BLACK | | 401 | 600 | 420 | | 1421 |
| BLUE | | 150 | 500 | 250 | | 900 |
| | | | | | | |
| TTL | | | | | | ***** |

SWATCH /COLOR

| MAIN: BLACK (CHARCOAL) | MAIN: BLUE (LACK) |
|---|---|
| MAIN: | MAIN: |

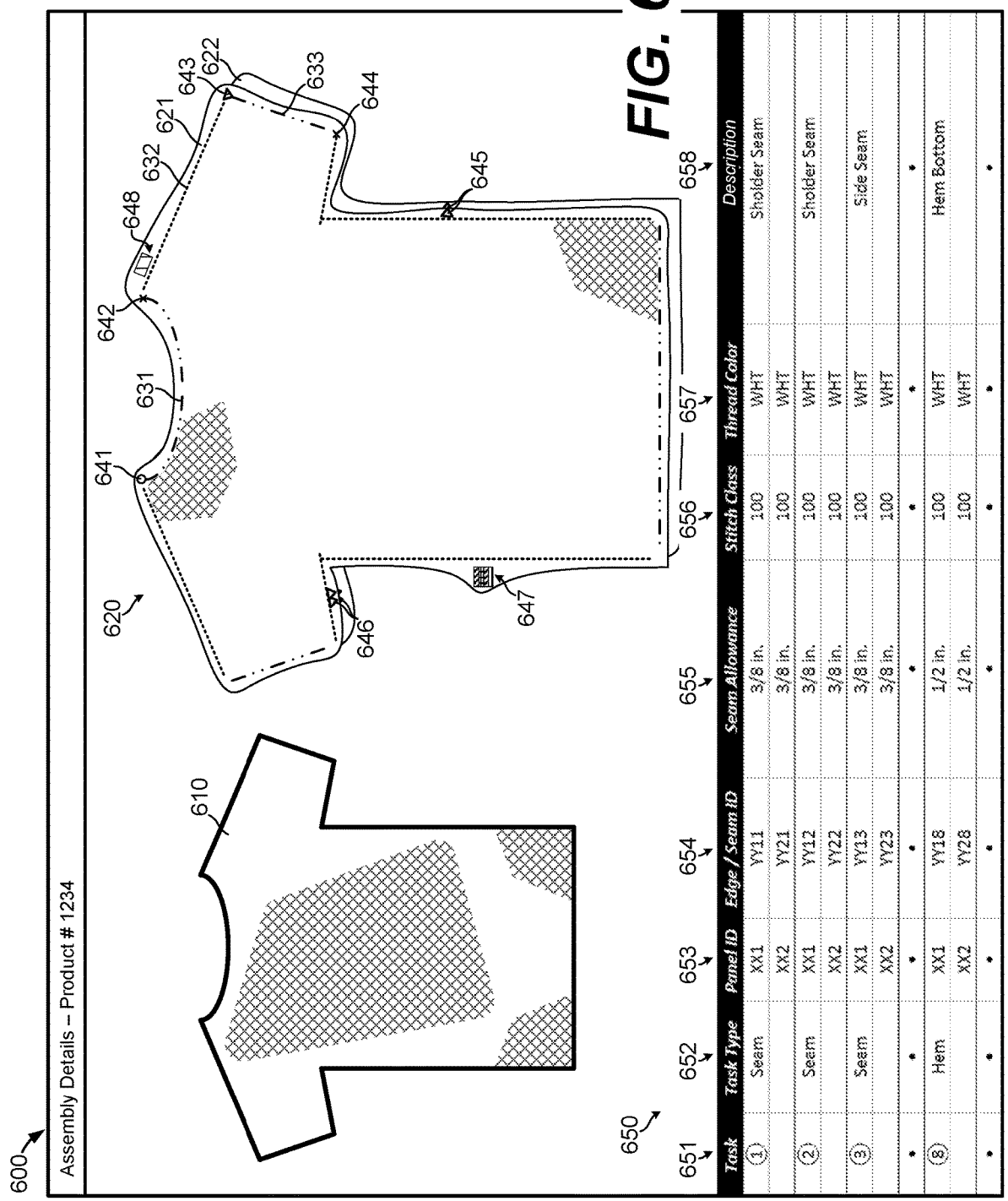

ORGANIZED ASSEMBLY INSTRUCTION PRINTING AND REFERENCING

This application is related to U.S. patent application Ser. No. 14/970,874, filed Dec. 16, 2015, titled "On Demand Apparel Manufacturing" ("the '874 Application") and U.S. patent application Ser. No. 14/970,840, filed Dec. 16, 2015, titled "On Demand Apparel Panel Cutting" ("the '840 Application"), the entire disclosure of each of which related applications is hereby fully incorporated herein by reference. This application is also related to U.S. patent application Ser. No. 15/069,849, filed on the same date as this application, titled "Automated Fabric Picking" ("the '849 Application") and U.S. patent application Ser. No. 15/069,855, filed on the same date as this application, titled "Continuous Feed Fabric Cutting" ("the '855 Application"), the entire disclosure of each of which related applications is hereby fully incorporated herein by reference.

BACKGROUND

The apparel manufacturing, retailing, and fitting industries include a diverse range of parties, such as designers, fabric manufacturers, apparel cutting and sewing workers, apparel retailers, tailors, and cleaners. The apparel manufacturing industry relies upon various resources, processes, and equipment to produce finished garments, accessories, footwear, etc. Generally, a process to manufacture a garment includes garment design, fabric production and/or printing, and panel cutting and sewing. Although automation has been applied to many apparel manufacturing processes, sewing workers are still heavily relied upon to cut and sew together pieces of fabric to produce finished garments. In that context, each garment requires a particular sequence of assembly tasks, and it is necessary for sewing workers to become familiar with the assembly steps for each new garment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 illustrates an example tech pack according to various embodiments of the present disclosure.

FIG. 6 illustrates an example display including an example textile product, assembly rendering, and table of assembly tasks according to various embodiments of the present disclosure.

DETAILED DESCRIPTION

Figure 1:
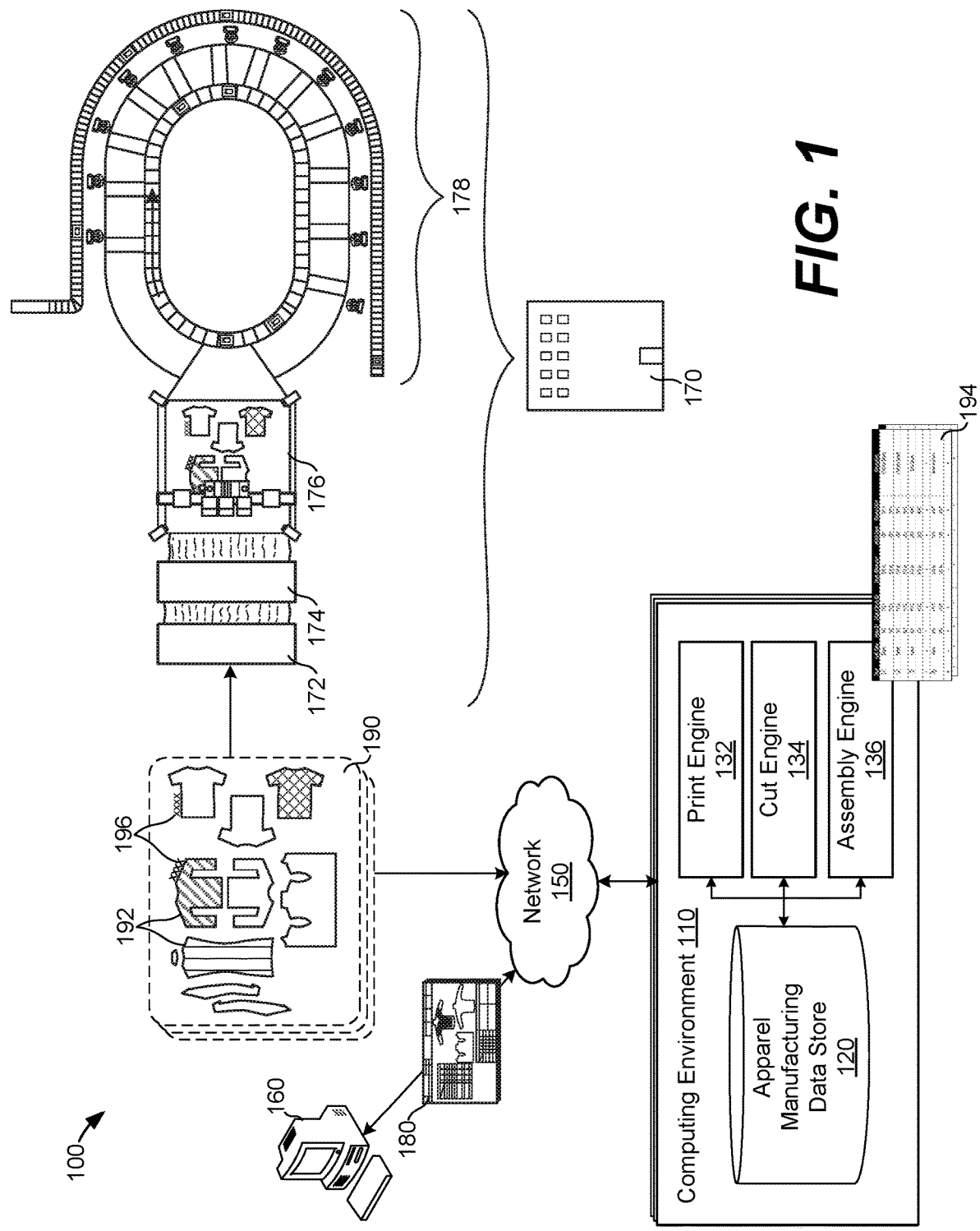
FIG. 1 illustrates a networked environment for organized assembly instruction printing and referencing according to various embodiments of the present disclosure.

Aspects of a system and method for organizing, printing, and referencing textile product assembly instructions are described herein. In one embodiment, a system includes a textile printer and a computing environment or device that directs the operations of the textile printer to print panels and instructions for the assembly of textile products. In one example, the computing environment is configured to receive one or more orders to purchase textile products, where each textile product is formed of one or more panels or pieces of fabric defined in a tech pack. The computing environment arranges the panels for the textile products into a textile panel template for printing on a textile sheet using the textile printer. The panels can include print patterns, graphics, or other print features based on the designs for the textile products. Once the panels are printed onto the textile sheet by the textile printer, they can be cut out from the textile sheet by a textile cutter. The panels are then placed into various containers or totes for assembly by sewing workers operating on a textile assembly production line, for example.

To assist the sewing workers in the assembly of the textile products, the computing environment is also configured to print certain instructions and/or notations on the textile sheet for reference along with the panels. As one example way to generate those instructions, the computing environment identifies one or more seams among the panels from which a textile product is to be assembled. In the textile product, a seam can be any line along which two panels or pieces of fabric are to be sewn together. With reference to the seams, among other assembly-related features or aspects of the textile product, the computing environment can compile assembly tasks in an assembly scheme for the textile product. The assembly tasks are those tasks which, when followed by a sewing worker, result in the assembly (or partial assembly) of the textile product. The computing environment can also order or sequence the assembly tasks based on one or more factors that impact assembly processes, such as factors that impact the efficiency of the tasks, the quality of the finished product, or the manner in which human or capital resources are utilized in the textile assembly production line.

Based on the ordered set of assembly tasks, the computing environment is further configured to generate a set of assembly notations to print on the textile sheet along with the panels. For example, a seaming task can be designated by one or more seam notations, such as a stitch line. Similarly, a hemming task can be designated by one or more hem notations, such as a hem marker line, and the attachment of fasteners can be designated by fastener notations. Thus, one or more of the assembly tasks can be represented by certain types of assembly notations, and those assembly notations can be printed onto the textile sheet at certain locations with the panels. Sewing workers can refer to the assembly notations to determine how textile products should be assembled using the panels. Further, in some cases, the panels can include machine-readable representations of one or more of the assembly instructions, such as bar codes, quick response codes, or other patterns that can be read and interpreted by a computer. Those machine-readable representations can be scanned at an assembly station and, in response, the computing environment can render a display that provides additional details related to the assembly tasks for the textile product.

Before turning to the figures, it is noted that the embodiments are not limited to the manufacture of any particular type(s) of textile, fabric, or clothing products from any particular type(s) of materials. Instead, the concepts described herein can be applied to the manufacture of a wide array of products, including clothing or fabric products, accessories (e.g., scarves, gloves, hats, bags, belts, etc.), footwear, bedding, curtains, towels, etc., in a wide variety of materials, including but not limited to paper, plastic, leather, rubber, and other materials. Thus, references to textiles or textile sheets are not intended to be limiting as to the types of materials that can be cut and/or assembled using the concepts described herein.

To provide an overview of the embodiments, FIG. 1 illustrates a networked environment 100 for organized assembly instruction printing and referencing. The networked environment 100 includes a computing environment 110, a network 150, and one or more client devices 160. At facility 170, the networked environment 100 also includes a textile printer 172, a textile dryer 174, a textile cutter 176, and a textile production line 178.

The locations of the computing environment 110, the client devices 160, and the facility 170 are representative in FIG. 1, and the embodiments can be organized and/or distributed in other ways than that shown. For example, the computing environment 110 can be geographically located, in part or in its entirety, at the facility 170. Alternatively, the computing environment 110 can be geographically dislocated from the facility 170 while controlling and/or directing the operation of certain equipment in the facility 170 via the network 150. In either case, the network 150 can facilitate two-way data and control communications between the computing environment 110 and certain equipment in the facility 170.

The computing environment 110 includes an apparel manufacturing data store 120, a print engine 132, a cut engine 134, and an assembly engine 136. In the networked environment 100, the computing environment 110 is configured to direct certain textile printing, cutting, and product assembly processes at the facility 170 through communications with and control of one or more of the textile printer 172, textile dryer 174, textile cutter 176, and textile production line 178 via the network 150.

The computing environment 110 is configured to collect orders for products, such as products that incorporate textile, paper, plastic, leather, rubber, and/or other materials from the client device 160. The orders can be received over time via the network 150 in the form of (or along with) tech packs 180, for example. Once received, the orders can be stored in the apparel manufacturing data store 120 for further processing by the computing environment 110. The tech packs 180 can be embodied as various types of digital files, such as job definition format (JDF) or other types of files that define instructions to manufacture one or more textile products at the facility 170, for example, among other facilities. The tech packs 180 can specify one or more fabrics, one or more panels (e.g., pieces of fabric that can be sewn together into textile products, items of apparel, etc.), fabric colors, print patterns, or graphics, fabric weaves, naps, knits, or embroidery patterns, product assembly instructions, fastener locations and/or specifications, product quantities, price and/or cost limitations or requests, and other specifications of textile or other products to be manufactured.

Once received, the print engine 132 of the computing environment 110 is configured to aggregate or collect orders defined in one or more of the tech packs 180. After the orders are aggregated, the print engine 132 generates one or more textile panel templates 190 including various arrangements of panels 192 for the products in the orders. The panels 192 are representative of individual pieces of fabric for textile products. Any number of panels 192 can be defined in the textile panel templates 190 along with print patterns and other features related to the panels 192. Generally, the textile panel templates 190 define instructions for the textile printer 172 to print certain panel outlines, print patterns, and other features on one or more textile sheets.

Once the panels 192 are printed on a textile sheet, the cut engine 134 of the computing environment 110 can instruct the textile cutter 176 to cut the panels 192 out from the textile sheet. Once they are cut out, the panels 192 can be placed into containers or totes for assembly by sewing workers on the textile production line 178 as described below. Although the panels 192 can be printed and cut out from a textile sheet, it is still necessary to provide instructions as to how the panels 192 should be assembled together to form finished textile products. In that context, according to aspects of the embodiments, the assembly engine 136 is configured to generate assembly schemes 194 for the assembly of textile products. Each assembly scheme 194 can include an ordered set of assembly tasks, such as stitching seams, attaching fasteners, hemming sides, etc. The assembly schemes 194 can be based, at least in part, on information provided in the tech packs 180. Once generated, the assembly schemes 194 can be stored in the apparel manufacturing data store 120 for later reference.

After generating an assembly scheme 194, the assembly engine 136 can also incorporate various types of assembly notations 196 into the textile panel templates 190. The assembly notations 196 can be printed by the textile printer 172 onto the textile sheets along with the print patterns and other features of the panels 192. As described in further detail below, each assembly notation 196 can be representative of one or more steps in an assembly process for a textile product and can be referenced as an assembly instruction by sewing workers. Among the other examples described below, a seaming task can be designated by one or more seaming notations, a hemming task can be designated by one or more hemming notations, and the attachment of fasteners can be designated by one or more fastening notations. The assembly notations 196 can be embodied using colors, shapes, numbers, and other unique and/or distinguished assembly-related features to convey assembly information based on an assembly notation syntax.

The assembly engine 136 can select the locations at which the assembly notations 196 are incorporated into the textile panel templates 190 based on certain factors described below. In some cases, the assembly notations 196 can be incorporated into a textile panel template 190 so that they will print on an opposite side of a textile sheet than print patterns for the panels 192 are printed on. In that way, the assembly notations 196 can be more easily hidden in finished textile products.

Once incorporated into the textile panel templates 190 and printed on textile sheets, sewing workers on the textile production line 178 can refer to the assembly notations 196 as printed instructions to assemble textile products. When based on a standard or known syntax of notations, the sewing workers may recognize each of the assembly notations 196 as a particular instruction for the assembly of textile products. Further, in some cases, the assembly notations 196 can include machine-readable representations, such as bar codes, quick response codes, or other patterns that can be read and interpreted by a computer as unique panel identifiers, unique seam identifiers, and/or particular assembly tasks. Those machine-readable representations can be scanned at an assembly station on the textile production line 178, for example, to generate a corresponding database query to the computing environment 110. In response, the computing environment 110 can render a display (or a network page for display) that provides additional details related to various assembly tasks with reference to the apparel manufacturing data store 120.

Beyond compiling assembly tasks and generating the assembly notations 196, the assembly engine 136 can also coordinate assembly processes for large numbers of textile products. For example, the assembly engine 136 can coordinate the transfer of panels 192 to various assembly stations of the textile production line 178. The manner in which the assembly engine 136 can coordinate assembly processes is described in further detail below.

The textile printer 172 can be embodied as any suitable type of printer for printing on textile fabrics or other materials. Textile printing is related to textile dyeing but, rather than uniformly dyeing a fabric sheet in its entirety, textile printing involves applying one or more colors to only certain parts or areas of a textile sheet, often in sharply defined patterns. In that context, the textile printer 172 may be embodied, for example, as a digital textile printer, digital garment printer, or direct-to-garment printer. The textile printer 172 can use specialized inkjet technologies, for example, to apply ink directly on fabrics. The textile printer 172 can apply water-based, acid, reactive, or other types of inks depending upon the type of fabric or other material being printed upon. In some embodiments, the textile printer 172 can apply one type of ink for print patterns of the panels 192 and another type of ink for the assembly notations 196. For example, the textile printer 172 can apply permanent ink for print patterns and washable ink for the assembly notations 196.

The textile printer 172 can print on fabrics that are woven, non-woven, knitted, netted, technical, etc., without limitation. The textile printer 172 can also print on other types of materials, such as paper, plastic, leather, rubber, and other materials. In some cases, the textile printer 172 can be embodied as a duplex-type printer capable of printing on both sides of a textile sheet or other material. For example, the textile printer 172 can include a duplexing subassembly to flip over a textile sheet after the first side of it has been printed on. In that case, the textile printer 172 can print patterns for the panels 192 on one side of a textile sheet, flip the textile sheet over, and print the assembly notations 196 on the other side of the textile sheet. In some embodiments, the textile dryer 174 can operate as or in connection with the duplexing subassembly to dry ink printed on one side of a textile sheet before it is flipped over for printing on the other side. As noted above, the textile printer 172 receives instructions from the print engine 132 over the network 150 for printing various panels of textile products along with certain assembly notations associated with the assembly of the panels.

The textile dryer 174 can be embodied as any suitable type of dryer for drying ink printed on textile fabrics or other materials. The textile dryer 174 can include adjustable infrared or heat panels, for example, to dry or cure ink applied by the textile printer 172, as needed. In some embodiments, the textile dryer 174 may not be necessary based on the printing/ink technology used by the textile printer 172. Thus, the textile dryer 174 may be omitted and/or incorporated with the textile printer 172 in some embodiments. The operation of the textile dryer 174 can be controlled by the print engine 132 over the network 150, as needed.

The textile cutter 176 can be embodied as any suitable type of cutter, cutting table, or cutting machine. For cutting and manipulating various types of fabrics and other materials, the textile cutter 176 can include one or more drag knives, wheel knives, lasers, pneumatic and/or electric oscillating cutting knives, lasers, and/or other tools, pneumatic and/or electric rotary cutting knives and/or tools, scoring tools, v-cutting (e.g., scissor-type) tools, partout tools, creasing tools, routing and/or engraving tools, and other types of tools. The textile cutter 176 can include adjustable vacuums, rollers, clips, hold-downs, etc., to hold and/or maneuver textile sheets and other materials fed into the textile cutter 176. As noted above, the cut engine 134 is configured to generate cut control instructions for the textile cutter 176, and the cut control instructions can be communicated to the cut engine 134 as part of two-way control communications over the network 150.

In one embodiment, textile sheets can be fed directly from the textile printer 172 into the textile dryer 174 and, subsequently, the textile cutter 176. In other embodiments, the textile sheets can be manually moved and fed from the textile printer 172, to the textile dryer 174, and to the textile cutter 176.

The textile production line 178 can be embodied as an arrangement of one or more conveyors, totes, sewing or assembly stations, and associated drive and control systems. Once the panels 192 are cut out from the textile sheets by the textile cutter 176, the cut-out panels can be placed into one or more totes of the textile production line 178 for routing along its conveyor system to the sewing or assembly stations. Depending upon the type of the orders being processed, the assembly engine 136 can generate instructions for placing the panels into the totes. The assembly engine 136 is further configured to generate instructions for directing the totes along the conveyor system of the textile production line 178.

For example, if one item, such as a dress, is being assembled for an order, the assembly engine 136 can generate instructions to place all panels for the dress into one tote and direct the tote along the conveyor system to a single sewing station for assembly. Alternatively, if several jackets are being assembled, the assembly engine 136 can generate instructions to place several panel-pairs (i.e., panels that are to be sewn together) into a tote and direct the tote along the conveyor system to a single sewing station for assembly. At the sewing station, an attendant and/or automated sewing machine can assemble each of the panel-pairs, and the assembly engine 136 can generate further instructions to direct the assembled panel-pairs to another sewing station along the conveyor system for additional steps in the assembly of the jackets.

Figure 2:
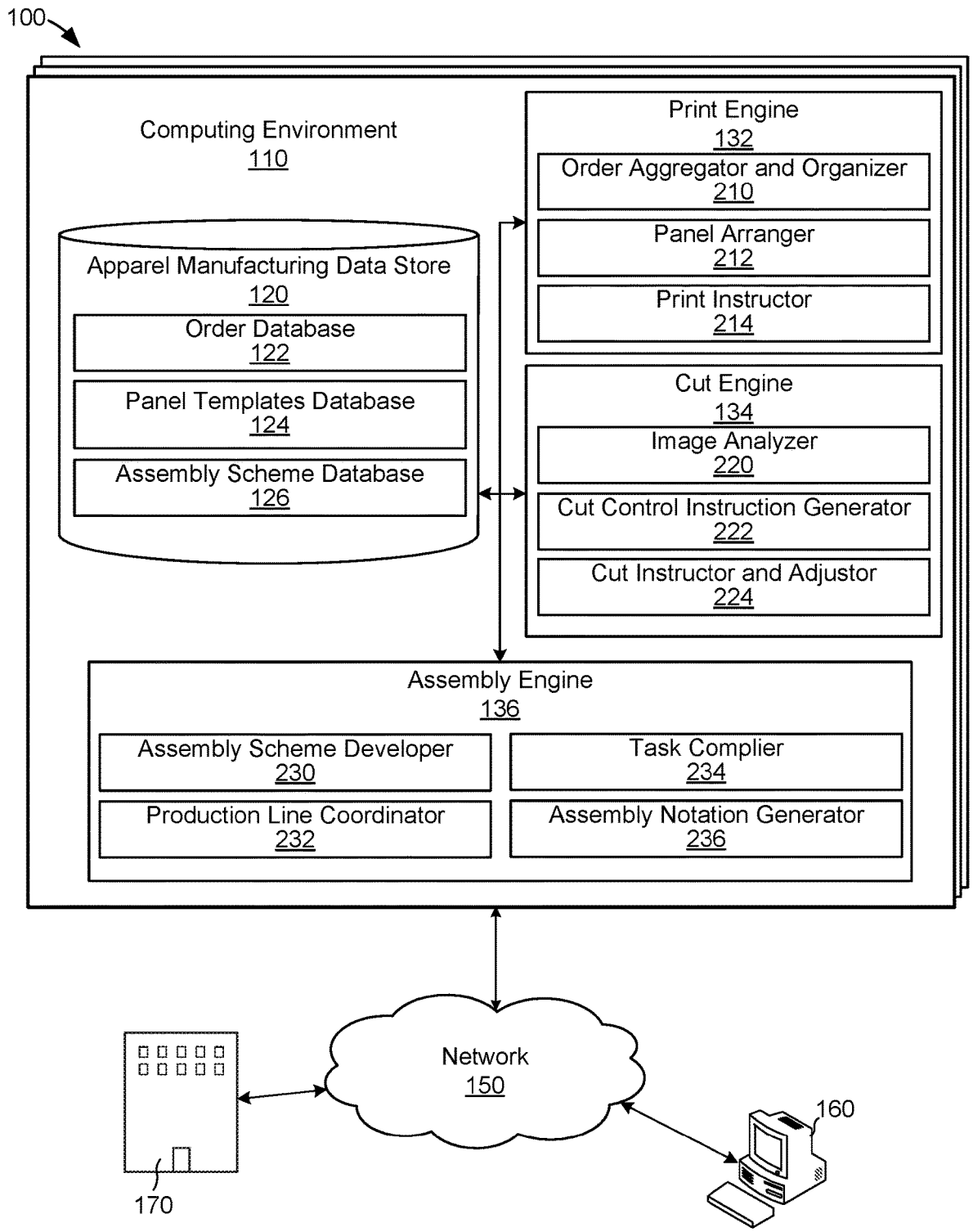
FIG. 2 illustrates a more detailed view of the computing environment shown in FIG. 1 according to various embodiments of the present disclosure.

FIG. 2 illustrates a more detailed view of the computing environment 110 for on demand apparel manufacturing shown in FIG. 1. The computing environment 110 may be embodied as one or more computers, computing devices, or computing systems. In certain embodiments, the computing environment 110 may include one or more computing devices arranged, for example, in one or more server or computer banks. The computing device or devices may be located at a single installation site or distributed among different geographic locations. The computing environment 110 may include a plurality of computing devices that together embody a hosted computing resource, a grid computing resource, and/or other distributed computing arrangement. In some cases, the computing environment 110 may be embodied as an elastic computing resource where an allotted capacity of processing, network, storage, or other computing-related resources varies over time.

The computing environment 110 may also be embodied, in part, as various functional and/or logic (e.g., computer-readable instruction, device, circuit, processing circuit, etc.) elements configured to direct the computing environment 110 to perform aspects of the embodiments described herein. Additionally, to the extent that it interfaces over the network 150 with computing and/or control devices of the textile printer 172, textile dryer 174, textile cutter 176, and textile production line 178 (FIG. 1) through service interfaces, application programming interfaces (APIs), etc., the computing environment 110 can be embodied as a collection of computing devices that includes the computing and/or control devices (or capabilities) of the textile printer 172, textile dryer 174, textile cutter 176, and textile production line 178.

The network 150 may include the Internet, intranets, extranets, wide area networks (WANs), local area networks (LANs), wired networks, wireless networks, cable networks, satellite networks, other suitable networks, or any combinations thereof. It is noted that the computing environment 110 may communicate with the computing and/or control devices of the textile printer 172, textile dryer 174, textile cutter 176, and textile production line 178 (FIG. 1) using various systems interconnect models and/or protocols, such as simple object access protocol (SOAP), representational state transfer (REST), real-time transport protocol (RTP), user datagram protocol (UDP), internet protocol (IP), transmission control protocol (TCP), and/or other protocols for communicating data over the network 150, without limitation. The network 150 provides connections to various client devices and network hosts, such as the client devices 160, website servers, file servers, networked computing resources, databases, data stores, or any other network devices or computing systems.

The client devices 160 can be embodied as any type of computing device, processing circuit, or processor based device or system used by individuals, including those embodied in the form of a desktop computer, a laptop computer, a personal digital assistant, a cellular telephone, or a tablet computer, among others. The client devices 160 can include one or more peripheral and/or input devices, such as keyboards, keypads, touch pads, touch screens, microphones, cameras, etc.

As shown in FIG. 2, the apparel manufacturing data store 120 includes an order database 122, a panel templates database 124, and an assembly scheme database 126. The print engine 132 includes an order aggregator and organizer 210, a panel arranger 212, and a print instructor 214. The cut engine 134 includes an image analyzer 220, a cut control instruction generator 222, and a cut instructor and adjustor 224. Further, the assembly engine 136 includes an assembly scheme developer 230, a production line coordinator 232, a task complier 234, and an assembly notation generator 236.

The order database 122 includes a database of orders for textile products received from the client devices 160. In that context, the order database 122 can include a database of the tech packs 180, for example, along with any other specifications, quantities, price and/or cost limitations or requests, and other information associated with orders. The panel templates database 124 can include a database of the textile panel templates 190 (FIG. 1) generated by the print engine 132 and/or the assembly engine 136, as described herein. The assembly scheme database 226 can include a database of all the individual panels in the textile panel templates 190, along with unique identifiers for those panels, assembly instructions associated with those panels, and other information. The apparel manufacturing data store 120 is not limited to storing the information described above, as other information and/or data can also be stored in the apparel manufacturing data store 120.

Turning to the print engine 132, the order aggregator and organizer 210 is configured to aggregate and organize orders received from the client devices 160 based on one or more productivity or efficiency factors, such as size, shape, fabric type, delivery location, etc. For example, if a number of the orders specify fulfillment in the geographic location surrounding Seattle, Wash., the computing environment 110 may organize those orders into a group of orders for manufacture and/or fulfillment at a facility other than the facility 170. As another example, if a number of the orders specify textile products for manufacture using a type of fabric only available at the facility 170, the computing environment 110 may organize those orders into a group of orders for manufacture and/or fulfillment at the facility 170. Generally, by aggregating orders from several client devices 160 and coordinating apparel manufacture and assembly processes on a relatively large scale, the networked environment 100 provides new ways to increase efficiency in apparel manufacturing. Further aspects of aggregating orders for efficiency are described in the '874 application.

The panel arranger 212 is configured to arrange panels 192 for textile products into one or more textile panel templates 190 as noted above. The panels 192 can be representative of one or more sections or portions of fabric or other materials from which shirts, pants, dresses, or other accessories or items can be assembled. In one embodiment, when arranging the panels 192, the panel arranger 212 is configured to closely align the panels 192 among each other to the extent possible to reduce scrap in textile sheets. Additionally or alternatively, the panel arranger 212 can orient the panels 192 in the textile panel templates 190 to align with a thread, weave, nap, knit, or print pattern(s) in textile sheets. The panel arranger 212 is also configured to assign a unique identifier to each panel 192 in the textile panel templates 190 and store those unique identifiers in the apparel manufacturing data store 120 for reference by the computing environment 110.

In one embodiment, the panel arranger 212 is configured to generate the textile panel templates 190 in a machine-readable computer-aided-manufacturing (CAM) or similar file format. In that case, the textile panel templates 190 can be provided, in relevant part(s), as instructions from the computing environment 110 to one or more of the textile printer 172, the textile dryer 174, or the textile cutter 176 over the network 150.

The print instructor 214 is configured to coordinate the printing operations of textile printers, such as the textile printer 172, over the network 150. For example, the print instructor 214 can generate print instructions based on one or more of the textile panel templates 190 and forward those instructions (or the textile panel templates 190 themselves) to the textile printer 172. Additionally, the print instructor 214 is configured to monitor the ongoing printing operations of the textile printer 172. In that context, the print instructor 214 can identify printing errors, printing delays, and other printing-related activities and factors at the textile printer 172 based on the two-way data and control communications between the computing environment 110 and the textile printer 172. In that way, the print instructor 214 can coordinate the printing operations of the textile printer 172 with the operations directed by the cut engine 134 and the assembling operations directed by the assembly engine 136.

Turning to the cut engine 134, the image analyzer 220 is configured to capture images of the panels 192 printed on a textile sheet (or sheet of another material) during cutting processes performed by the textile cutter 176. In that context, consistent with the description provided in the '874 application, the textile cutter 176 can include an arrangement of cameras to capture images of textile sheets being cut. Using the images of textile sheets, the image analyzer 220 is configured to identify factors to control the cut of the textile sheet. For example, a textile thread, weave, nap, or knit of the textile sheet, textile print pattern alignment on the textile sheet, or panel deformation of the textile sheet can be identified by the image analyzer 220. The image analyzer 220 can also identify various features printed on the textile sheets by the textile printer 172, such as the assembly notations 196, panel cutouts for the panels 192, cut alignment markers, and other features.

Based on the analysis performed by the image analyzer 220, the cut control instruction generator 222 can generate cut control instructions to cut out the panels 192 from the textile sheets. Similarly, the cut control instruction generator 222 can generate cut control instructions to cut out the panels 192 along with the assembly notations 196. Thus, the cut-out panels or fabric pieces can include the assembly notations 196 printed directly upon them. The cut control instructions can be generated in the form of a CAM or similar file format for processing and/or interpretation by the textile cutter 176. In the generation of cut control instructions, the cut control instruction generator 222 can refer to various types of information. For example, the cut control instruction generator 222 can refer to the analysis performed by the image analyzer 220, the textile panel templates 190, the specifications of the textile sheets (e.g., the type, thickness, grade, weave pattern, thread count, etc.) being cut, and other factors.

After they are generated, the cut instructor and adjustor 224 can forward the cut control instructions to the textile cutter 176 over the network 150. The cut instructor and adjustor 224 is also configured to adapt the cut control instructions, over time and during cutting operations, based on the analysis performed by the image analyzer 220. By capturing images of textile sheets after panels and/or print patterns have been printed on them and adjusting the cut control instructions provided to the textile cutter 176 using feedback gathered from images, the cut instructor and adjustor 224 can dynamically adjust the cutting operations performed by the textile cutter 176.

Turning to the assembly engine 136, the assembly scheme developer 230 is configured to generate the assembly schemes 194 and incorporate the assembly notations 196 into the textile panel templates 190. To generate the assembly schemes 194, the assembly scheme developer 230 can identify one or more seams in textile products such that, when the panels 192 are stitched together along the seams, the textile products are assembled together. In that context, a seam can be embodied as any length of fabric along which one or more panels or pieces of fabric should be sewn together in a textile product. A given textile product may include any number of seams, but it is not necessary that all textile products include seams. The assembly scheme developer 230 can identify the seams with reference to the tech packs 180, for example. As the assembly scheme developer 230 identifies the seams, it can also assign unique seam identifiers to each of the seams and store those unique seam identifiers in the apparel manufacturing data store 120.

With reference to the seams, among other assembly-related features or aspects of textile products, the task complier 234 is configured to compile a list of assembly tasks required to assemble the textile products. The assembly tasks can include panel identification tasks, seam stitching tasks, edge hem tasks, fastener attachment tasks, and other textile-related assembly tasks. As described in further detail below, the task complier 234 can also recognize variations of the same type of task, such as different types of stitches, stitch classes, seam allowances, and thread colors for seam stitching tasks, for example. As the task complier 234 compiles the list of assembly tasks, it can also assign unique task identifiers to each of the tasks and store those unique task identifiers in the apparel manufacturing data store 120.

After the list of assembly tasks is compiled for a given textile product, the task complier 234 can order the assembly tasks into an ordered set of assembly tasks. In various examples, the order of the assembly tasks can be set according to instructions defined in the tech packs 180 or determined, at least in part, directly by the task complier 234. The task complier 234 can order the assembly tasks based on one or more assembly factors, such as assembly factors that impact the efficiency of the tasks, the quality of the finished product, or the manner in which human or capital resources are utilized in the textile assembly production line. For example, the order of stitching seams in a textile product can be selected to make the overall assembly process simpler for sewing workers, to increase efficiency, to ensure quality, or to avoid mistakes.

Once the ordered set of assembly tasks is determined by the task complier 234, the assembly notation generator 236 is configured to generate a set of assembly notations 196 based on the assembly tasks and the order of the assembly tasks. The assembly notations 196 can be generated based on an assembly notation syntax that incorporates the use of certain assembly notation symbols, letters, numbers, and/or colors to designate various tasks and/or an order of those tasks. For example, assembly notation symbols can designate a stitch start marker, a stitch end marker, an assembly instruction block, or an assembly alignment marker, among other assembly symbols. The assembly notations 196 can also make use of different colors according to the assembly notation syntax, where the colors can indicate various tasks and/or an order of those tasks.

The assembly notation generator 236 is also configured to incorporate the assembly notations 196 into one or more of the textile panel templates 190. When incorporating the assembly notations 196 into the textile panel templates 190, the assembly notation generator 236 can identify appropriate or preferred locations to insert each assembly notation 196. For example, stitch start markers can be inserted at locations where seam stitching tasks begin, and stitch end markers can be inserted at locations where seam stitching tasks end. As another factor, the locations can be selected so that the assembly notations 196 will be inconspicuous or hidden in textile products, once assembled. To that end, the assembly notation generator 236 can locate one or more of assembly notations 196 on a back or opposite side of a textile sheet from that used to print patterns for the panels 192.

The assembly notation generator 236 can also generate machine-readable representations, such as bar codes or quick response codes, of any of the unique identifiers of the panels 192, unique identifiers of the seams, assembly tasks, and/or assembly notations 196. Those machine-readable representations can also be incorporated into the textile panel templates 190 at certain locations. Once the assembly notations 196 are incorporated into the textile panel templates 190, the textile printer 172 can print out the assembly notations 196 along with the panels 192 for reference by sewing workers as described in further detail below with reference to FIGS. 6, 7A and 7B.

The production line coordinator 232 is configured to generate instructions for placing cut-out panels 192 into totes of the textile production line 178. Where the textile production line 178 is relied upon for the assembly of textile and/or other products, the production line coordinator 232 can generate instructions to direct the panels 192 to various assembly stations on the textile production line 178. As an example, if one item, such as a dress, is being assembled for an order, the production line coordinator 232 can generate instructions to place all panels for the dress into one tote and direct the tote along the conveyor system of the textile production line 178 to a single assembly station for assembly. Alternatively, if several jackets are being assembled, the production line coordinator 232 can generate instructions to place several panel-pairs (i.e., panels that are to be directly sewn together) into a tote and direct the tote along the conveyor system to a single assembly station. At the assembly station, a sewing worker and/or automated sewing machine can assemble each of the panel-pairs, and the production line coordinator 232 can generate further instructions to direct the assembled panel-pairs to another assembly station along the conveyor system for additional steps in the assembly of the jackets.

FIG. 3 illustrates an example tech pack 180 for apparel manufacturing according to various embodiments of the present disclosure. FIG. 3 is provided by way of example of the types of information that can be included or defined in a tech pack 180, but is not intended to be limiting, as the requirements for different textile and other products vary. Further, the tech pack 180 is not necessarily representative of the format or of the types of information included or defined in all orders for products received from the client devices 160. In various embodiments, the tech packs 180 can be embodied as digital or electronic files, such JDF or other types of files.

As shown in FIG. 3, the tech pack 180 includes the specifications of a textile product, including size specifications 302, order piece/assortment specifications 304, panel size and shape specifications 310-312, fabric type/print pattern specifications 320 and 321, and fastener specifications 330. Although not shown in FIG. 3, the tech pack 180 can also include or define assembly specifications, such as seams, hems, stitch patterns, thread types and/or colors, a suggested order of assembly tasks or operations, etc. As discussed above, the tech pack 180 can be generated at any of the client devices 160 and forwarded to the computing environment 110 over the network 150.

Figure 4:
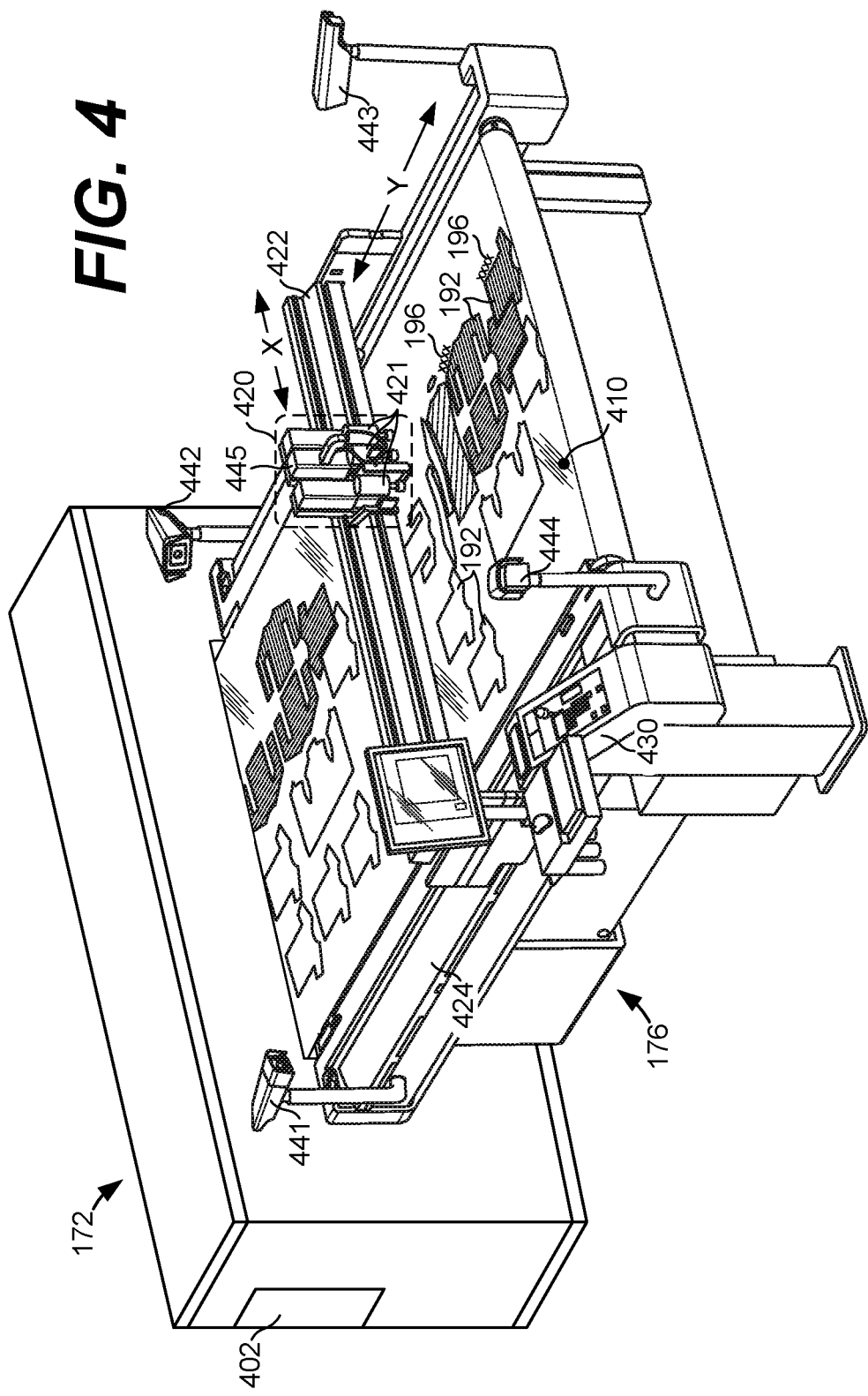
FIG. 4 illustrates an example textile printer and textile cutter according to various embodiments of the present disclosure.

FIG. 4 illustrates the textile printer 172 and the textile cutter 176 according to various embodiments of the present disclosure. In FIG. 4, the textile dryer 174 shown in FIG. 2 is omitted for simplicity. It is noted, however, that the textile dryer 174 can be placed between the textile printer 172 and the textile cutter 176 or incorporated with the textile printer 172. The textile printer 172 includes a controller 402 that directs the operation of the textile printer 172. The controller 402 can be embodied as any suitable combination of analog, digital, or analog and digital processing circuitry, including memory, configured to control the operation of textile printer 172. Thus, the controller 402 can be embodied as a collection of vendor-specific logic, software, and/or hardware that directs the textile printer 172 to perform various printing operations. The controller 402 also includes the physical and logical interfaces for two-way control communications with the print engine 132 over the network 150, such as physical layer network interfaces, service interfaces, APIs, etc.

As described above, the textile printer 172 receives print control instructions from the print engine 132 over the network 150. For example, the print instructor 214 can generate print instructions based on one or more of the textile panel templates 190 and forward those instructions (or the textile panel templates 190 themselves) to the textile printer 172 for printing. The print instructor 214 can also monitor the ongoing printing operations of the textile printer 172 and coordinate the printing operations with the cutting operations performed by the textile cutter 176.

Based on the print control instructions received from the print engine 132, the textile printer 172 prints patterns and/or other features for various panels 192 on the textile sheet 410 (or sheets of other material(s)). Based on the instructions, the textile printer 172 can also print various assembly notations 196 on the textile sheet 410. As shown in FIG. 4, the textile printer 172 can also print different print patterns on or over certain panels 192 on the textile sheet 410. The panels 192, assembly notations 196, and print patterns shown in FIG. 4 are representative, and it is noted that the textile printer 172 can print any other arrangements of the panels 192, assembly notations 196, and print patterns.

After printing, the textile sheet 410 is fed from the textile printer 172 to the textile cutter 176, where the panels 192 and assembly notations 196 are cut out from the textile sheet 410. The textile cutter 176 can include adjustable vacuums, rollers, clips, hold-downs, etc., to hold and/or maneuver the textile sheet 410 as it is being fed from the textile printer 172 for cutting. In one embodiment, the textile cutter 176 includes a cutting head assembly 420 adjustably mounted to an articulating rail 422. The articulating rail 422 is adjustably mounted to a table 424 of the textile cutter 176. Using motors, pulleys, or another suitable mechanism, the cutting head assembly 420 can move or slide along the articulating rail 422 in the "X" direction, and the articulating rail 422 can move or slide along the table 424 in the "Y" direction. Thus, the cutting head assembly 420 is configured to traverse the table 424 to cut panels out from the textile sheet 410.

The cutting head assembly 420 includes one or more tools 421 for cutting panels out of the textile sheet 410. For example, the tools 421 can include one or more drag knives, wheel knives, lasers, pneumatic, and/or electric oscillating cutting knives, and/or tools, pneumatic, and/or electric rotary cutting knives, and/or tools, scoring tools, v-cutting (e.g., scissor-type) tools, partout tools, creasing tools, routing, and/or engraving tools, and other types of tools for cutting, and/or manipulating the textile sheet 410. In other examples, the textile cutter 176 can be embodied as a laser cutting continuous feed system, as described in the '855 Application.

The textile cutter 176 also includes cameras 441-444 placed around the table 424 and, in some embodiments, another camera 445 in the cutting head assembly 420. The camera 445 in the cutting head assembly 420 provides a close view of the tools 421 and the operations performed by the tools 421. The cameras 441-445 can include any suitable type of image sensor for capturing the details of the textile sheet 410. In one embodiment, the cameras 441-445 can include high-resolution image sensors capable of capturing thread or weave patterns in the textile sheet 410, as well as fine details printed on the textile sheet 410 by the textile printer 172. In one embodiment, the cameras 441-445 can include an image sensor capable of capturing the reflection of long wave ultraviolet ("UV") light. In that case, the cameras 441-445 may also include UV light bulbs or emitters that cast UV light upon the textile sheet 410. In that way, UV light reflected by washable, UV-reflective inks printed upon the textile sheet 410 by the textile printer 172 can be captured in images by the cameras 441-445.

Using images captured by the cameras 441-445, the image analyzer 220 is configured to identify factors to control the cut of the textile sheet 410 by the textile cutter 176. For example, a textile thread, weave, nap, or knit pattern of the textile sheet 410, textile print pattern alignment on the textile sheet 410, or panel deformation of the textile sheet 410 on the table 424, can be identified by the image analyzer 220. The image analyzer 220 can also identify certain features printed on the textile sheets by the textile printer 172, such as the assembly notations 196, panel cutouts for the panels 192, cut alignment markers, and other features.

Similar to the textile printer 172, the textile cutter 176 also includes a controller 430 that directs the operation of the textile cutter 176. The controller 430 can be embodied as any suitable combination of analog, digital, or analog and digital processing circuitry, including memory, configured to control the operation of the textile cutter 176. Thus, the controller 430 can be embodied as a collection of vendor-specific logic, software, and/or hardware that directs the textile cutter 176 to perform various cutting operations. The controller 430 also includes the physical and logical interfaces for two-way control communications with the cut engine 134 over the network 150, such as physical layer network interfaces, service interfaces, APIs, etc.

Figure 5:
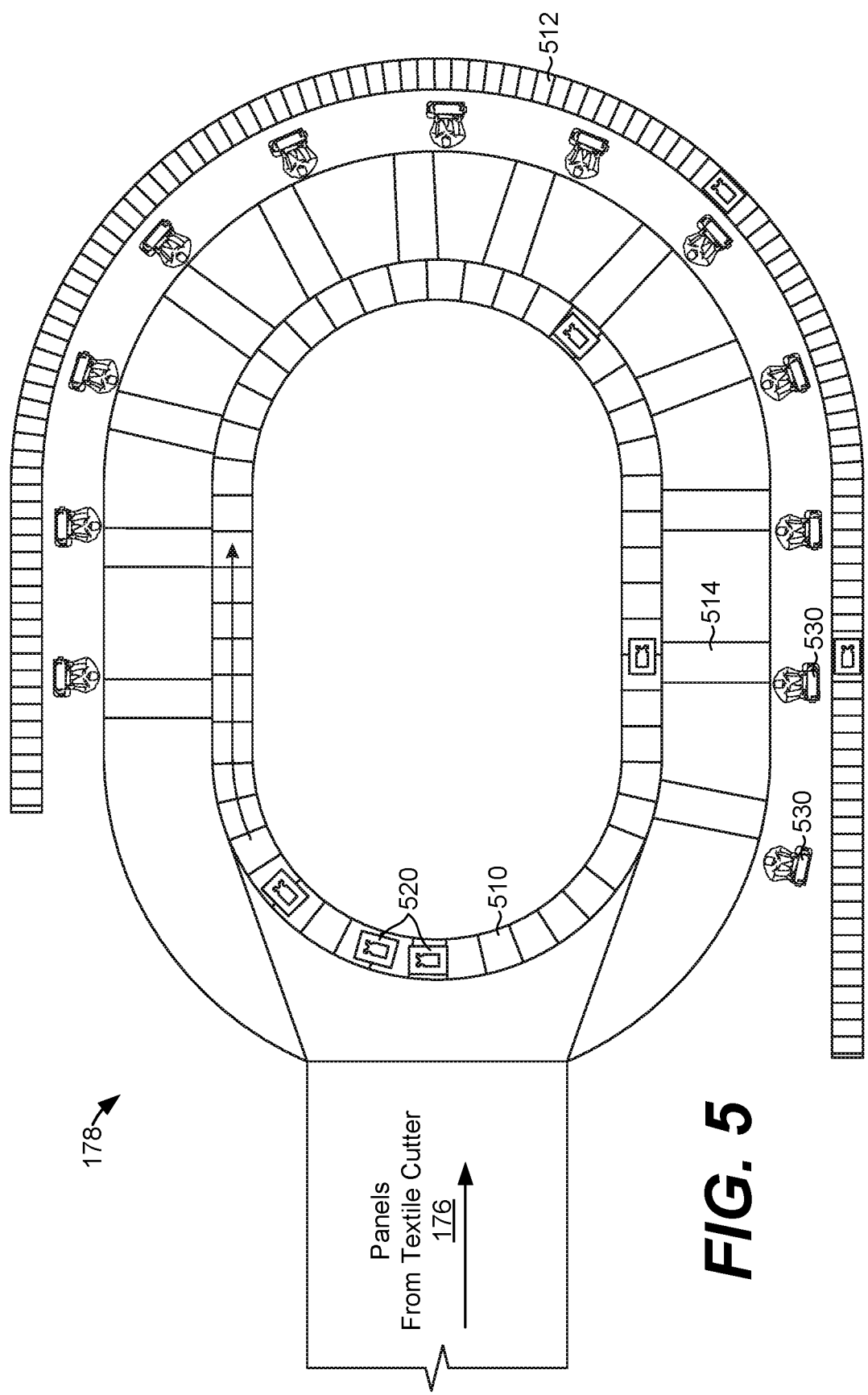
FIG. 5 illustrates an example textile production line according to various embodiments of the present disclosure.

FIG. 5 illustrates an example of the textile production line 178 shown in FIG. 1 according to various embodiments of the present disclosure. The textile production line 178 includes an inner conveyor 510, an outer conveyor 512, bilateral conveyors 514 between the inner conveyor 510 and the outer conveyor 512, totes 520 that can be directed along the inner conveyor 510, the outer conveyor 512, and the bilateral conveyors 514, and sewing or assembly stations 530, among other stations. It is noted that the textile production line 178 in FIG. 5 is provided as a representative example of a production line for the assembly of textile products. Other production lines can include alternative arrangements of conveyors and sewing or assembly stations. In other embodiments, the totes 520 can be moved among the sewing or assembly stations 530 using automated vehicles. In still other embodiments, the totes 520 can be moved manually among the sewing or assembly stations 530.

As described above, the production line coordinator 232 of the computing environment 110 is configured to direct the operations of the textile production line 178. Particularly, the production line coordinator 232 is configured to direct the placement of the panels 192 from the textile cutter 176 into one or more of the totes 520 and to direct the totes 520 to one or more of the assembly stations 530. In that context, the production line coordinator 232 is configured to generate an ordered set of instructions for the assembly of textile products with reference to the assembly schemes 194 and any other relevant information.

Based on the information defined in the assembly schemes 194, one or more cut-out panels 192 from the textile cutter 176 can be assigned for placement into one or more of the totes 520. Particularly, depending upon the type of the orders being processed, the production line coordinator 232 is configured to generate instructions for placing the panels 192 from the textile cutter 176 into the totes 520. In one embodiment, the panels 192 may be transferred from the textile cutter 176 into the totes 520 using gravity chutes, intermediary conveyors, or other mechanisms. In other embodiments, the panels can be placed into the totes 520 using a transfer arm or another automated fabric picker as described in the '840 Application and/or the '849 Application.

Based on the information defined in the assembly schemes 194, the production line coordinator 232 can also generate instructions for directing the totes 520 along one or more of the inner conveyor 510, the outer conveyor 512, and the bilateral conveyors 514. As an example, if one item, such as a dress, is being manufactured for an order, the production line coordinator 232 can generate instructions to place all panels for the dress into one of the totes 520 and to direct the tote 520 to one of the assembly stations 530 for assembly.

Alternatively, if several jackets are being manufactured, the production line coordinator 232 can generate instructions to place several panel-pairs (i.e., panels that are to be directly sewn together) into a tote 520 and direct the tote 520 along one or more of the inner conveyor 510, the outer conveyor 512, and the bilateral conveyors 514 to a first one of the assembly stations 530 for assembly. At the first assembly station 530, a sewing worker and/or automated sewing machine can assemble each of the panel-pairs, and the production line coordinator 232 can generate further instructions to direct the assembled panel-pairs to a second one of the assembly stations 530 for additional steps, e.g., other panels or components, in the assembly of the jackets. This process can continue, as needed, until the jackets are fully assembled.

The production line coordinator 232 can also monitor the overall operations of the textile production line 178 during assembly processes. The production line coordinator 232 can monitor the overall operations of the textile production line 178 using scanners or cameras to read barcodes on the totes 520, radio-frequency identifier (RFID) tags on the totes 520, electrically-actuated interlocks, and/or feedback from sewing workers, among other monitoring and feedback mechanisms.

Any control instructions generated by the production line coordinator 232 can be communicated to the textile production line 178 as part of two-way control communications between the assembly engine 136 and the textile production line 178 over the network 150. To coordinate its operations, the textile production line 178 can include a controller that directs the operation of the textile production line 178. The controller can be embodied as any suitable combination of analog, digital, or analog and digital processing circuitry, including memory, configured to control the operation of the inner conveyor 510, the outer conveyor 512, and the bilateral conveyors 514, among other subsystems. Thus, the controller can be embodied as a collection of vendor-specific logic, software, and/or hardware that directs the textile production line 178. The controller can also include the physical and logical interfaces for two-way control communications with the assembly engine 136 over the network 150, such as physical layer network interfaces, service interfaces, APIs, etc.

Each of the assembly stations 530 can include one or more pieces of equipment for the assembly of textile products, such as cutting machines, sewing machines, bonding machines, etc. To assist sewing workers at the assembly stations 530, the assembly stations 530 can also include computer-directed display screens. The display screens can present instructions generated by the computing environment 110 based on the type of textile product currently being assembled.

For example, when sewing workers receive a tote 520 including panels 192, the panels 192 can include machine-readable representations of unique panel identifiers, unique seam identifiers, and/or particular assembly tasks as described herein. Those machine-readable representations can be scanned at the assembly stations 530 using bar code scanners or cameras, for example. In turn, a corresponding database query can be submitted to the computing environment 110. Based on the database query, the computing environment 110 can render a network page for display on a display screen at the assembly stations 530. The network page can include additional details related to various assembly tasks based on the information contained in the apparel manufacturing data store 120. Such network pages or displays can be communicated to the textile production line 178 as part of two-way control communications between the assembly engine 136 and the textile production line 178 over the network 150. Examples of such displays are described in further detail below with reference to FIGS. 6 and 7.

FIG. 6 illustrates a display 600 including an example textile product 610, assembly rendering 620, and table 650 of assembly tasks. The display 600 can be rendered on a display screen at one of the assembly stations 530, for example, using a network page generated by the computing environment 110. The display 600 can be provided when a tote 520 arrives at one of the assembly stations 530 and/or when a sewing worker calls up the display 600 based on a query to the computing environment 110 as described herein. The display 600 is provided as an example of information that can be provided to sewing workers on the textile production line 178 by the computing environment 110 and can be generated for any type of textile product.

The textile product 610 is shown as a shirt in FIG. 6, and the assembly rendering 620 illustrates two cut-out panels 621 and 622 of the shirt. The assembly rendering 620 also includes assembly notations on the cut-out panels 621 and 622, including seam notations 631-633, stitch notations 641-644, alignment marks 645 and 646, and machine-readable identifiers 647 and 648. The assembly notations shown in FIG. 6 are provided by way of example and are not intended to be exhaustive of the types of notations that can be printed on panels according to the embodiments described herein. In addition to those shown, the assembly notations can include various instructions, pointers, references, and other information to assist sewing workers. Additionally, the assembly notations can specify the type of and locations for fasteners (e.g., buttons, zippers, etc.) in textile products. It is also noted that the assembly notations can be printed on either side of the cut-out panels 621 and 622 in permanent, invisible (e.g., except under UV light), or washable ink.

The cut-out panels 621 and 622 may be representative of the panels or pieces of fabric in a tote 520, as that tote 520 arrives at one of the assembly stations 530. At the same time, in the assembly rendering 620, the display 600 includes a representative rendering of the panels 621 and 622 in the tote 520. The assembly notations can be relied upon by sewing workers as instructions to assemble the textile product 610. At the same time, the display 600 is generated on the basis of the same information used to print the assembly notations 631-633, 641-644, 645 and 646, and 647 and 648 on the panels in the tote 520. For example, the display 600 can be generated by the computing environment 110 using an assembly scheme 194 for the textile product 610 stored in the apparel manufacturing data store 120. Thus, for the textile product 610, the assembly notation information shown in the display 600 is consistent with that which is printed on the cut-out panels 621 and 622 in the tote 520.

As noted above, the assembly notation generator 236 can generate the assembly notations 631-633, 641-644, 645 and 646, and 647 and 648 based on the assembly tasks in the table 650 of assembly tasks, which can be arranged in an ordered set of assembly tasks as described herein. The assembly notation generator 236 can also generate the assembly notations based on a standard or predetermined assembly notation syntax that defines instructions, in part, through the use of certain colors, symbols, shapes, line patterns, etc. The assembly notation generator 236 is also configured to determine appropriate or suitable locations in which to print the assembly notations 631-633, 641-644, 645 and 646, and 647 and 648 on the panels 621 and 622, and to incorporate them into a textile panel template 190 as described herein.

Referring again to FIG. 6, the display 600 also includes the table 650 of assembly tasks in an assembly scheme 194 for the textile product 610. As shown in FIG. 6, each assembly task is associated with a task number 651, a task type 652, a panel identifier 653, an edge or seam identifier 654, a seam allowance 655, a stitch class 656, a thread color 657, and a description 658. It is noted, however, that the table 650 can include other information depending, for example, on the type of textile product being assembled. That is, the table 650 is provided as an example in FIG. 6, and the table 650 may omit or include other task and/or assembly-related information.

The seam notations 631-633 designate seam lines along the panels 621 and 622. A sewing worker on the textile production line 178 can refer to the seam notations 631-633 to gather information about what seams, hems, etc. are present in the textile product 610 and how the textile product 610 can be assembled together using those seams. In some embodiments, the style of the seam notations 631-633 can be used to designate a particular type of seam. For example, the dotted line of the seam notation 632 can designate a seam line, while the dashed lines of the seam notations 631 and 633 can designate hem lines. In other examples, the seam notations 631-633 can additionally or alternatively be printed using different color inks to designate different types of seams, hems, etc. The seam notations 631-633 can also designate different seam allowances, stitch patterns, thread types, thread colors, and other information using different types of dotted and dashed lines, colors, etc.

The stitch notations 641-644 designate start and end locations for seams, hems, etc. In one embodiment, the stitch notations 641-644 can be printed as certain symbols, shapes, characters, or other indicators representative of starting and/or ending stitch locations. For example, as shown in FIG. 6, the circular stitch notation 641 is representative of a start location for the seam notation 631, and the cross notation 642 is representative of an end location along the seam notation 631. Similarly, the triangular stitch notation 643 is representative of a start location for the seam notation 633, and the cross notation 644 is representative of an end location along the seam notation 633. The stitch notations 641-644 can follow an assembly notation syntax to provide assembly sequence information. For example, the assembly notation syntax can specify that the first step in the assembly of the textile product 610 (and other textile products) is designated using a circular stitch notation, the second step is designated using a square stitch notation, a third step is designated using a triangular stitch notation, etc. In other examples, the assembly notation syntax can specify various stitch patterns, thread types, thread colors, and other information using certain symbols, shapes, characters, or other indicators.

The alignment marks 645 and 646 designate how the cut-out panels 621 and 622 should be aligned together in the textile product 610 before they are stitched together. As shown, each of the cut-out panels 621 and 622 includes a corresponding one of the alignment marks 645 and 646, at a location where the cut-out panels 621 and 622 should be aligned together before stitching. Depending upon the size and shape of the textile product 610, among other factors, the cut-out panels 621 and 622 can include any number of alignment marks 645 and 646 at any suitable location(s).

The machine-readable identifiers 647 and 648, which may be bar codes or quick response codes, for example, can be representative of various types of information, such as unique product identifiers, unique panel identifiers, unique seam identifiers, and/or particular assembly tasks. For example, the machine-readable identifier 647 can be associated with a unique product identifier for the textile product 610 or unique panel identifiers for the cut-out panels 621 and 622. Similarly, the machine-readable identifier 648 can be associated with a unique seam identifier for any of the seams in the cut-out panels 621 and 622. At any of the assembly stations 530 on the textile production line 178, the machine-readable identifiers 647 and 648 can be scanned by a sewing worker or other automated equipment to generate a query to the computing environment 110. The query can return the display 600 or any of the information shown in the display 600.

Figure 7A:
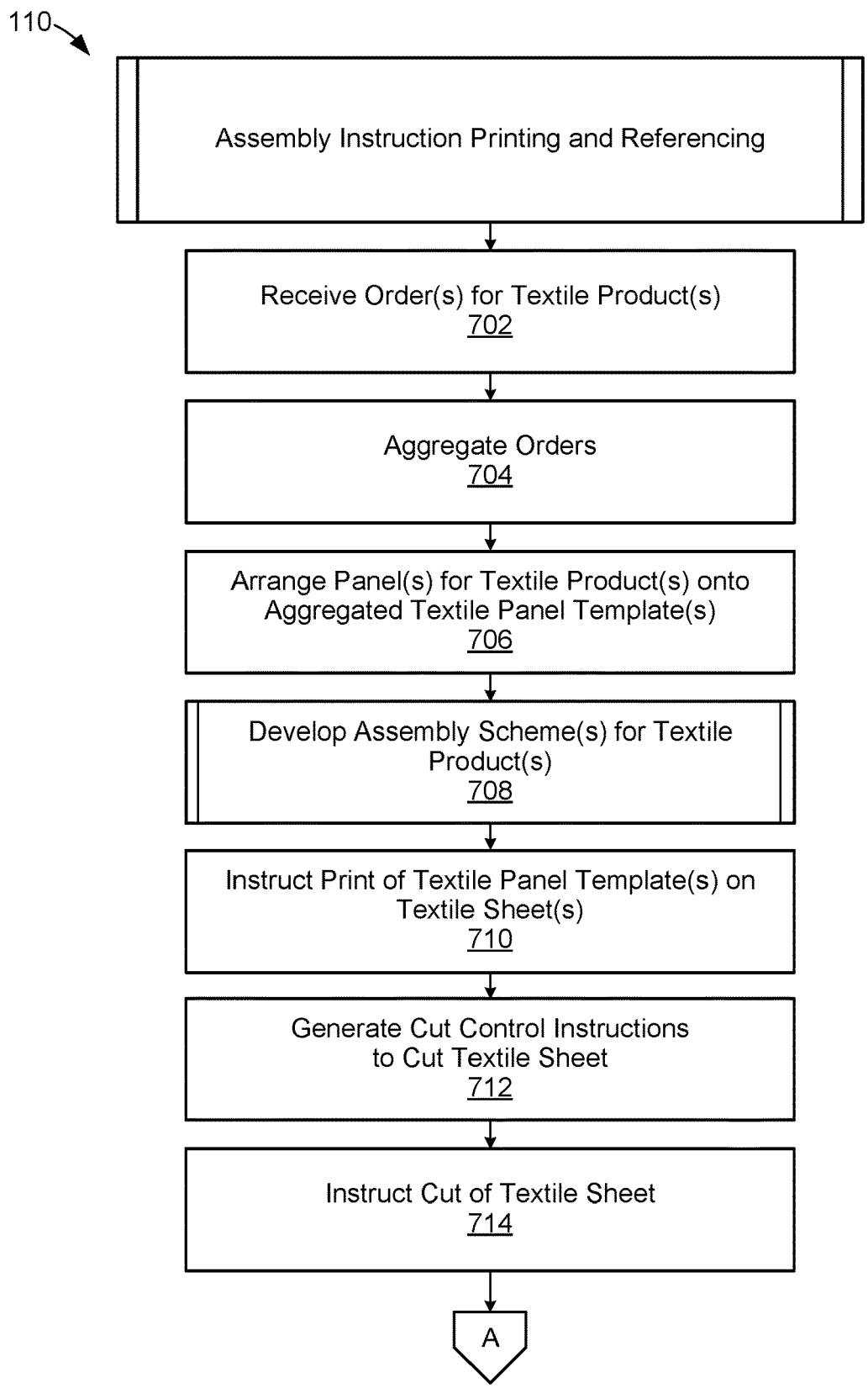
FIG. 7A illustrates an example assembly instruction printing and referencing process according to various embodiments of the present disclosure.
Figure 7B:
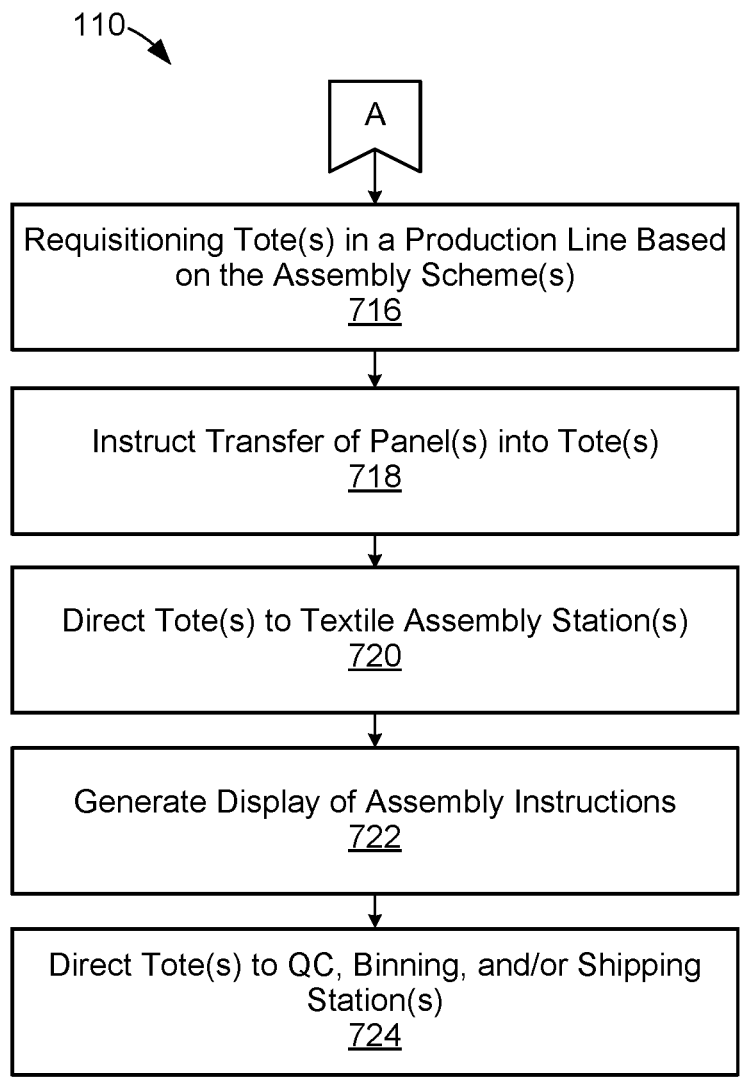
FIG. 7B further illustrates the example assembly instruction printing and referencing process in FIG. 7A according to various embodiments of the present disclosure.

Turning to FIGS. 7A and 7B, a process of on demand apparel manufacturing is illustrated. The process can be performed in the networked environment 100 in FIG. 1 according to various embodiments of the present disclosure. In certain aspects, the flowchart shown in FIGS. 7A and 7B may be viewed as depicting an example group of steps performed in the networked environment 100 according to one or more embodiments. It should be appreciated that the flowchart shown in FIGS. 7A and 7B provides merely one example of a functional sequence or arrangement that may be employed to implement the operations of the networked environment 100 described herein. It is noted here that, although the process is described in connection with the computing environment 110 shown in FIGS. 1 and 2, other computing environments may perform the process illustrated in FIGS. 7A and 7B.

At reference numeral 702, the process includes the computing environment 110 receiving orders for textile or other products. The orders can be received from the client devices 160 over the network 150 and stored in the apparel manufacturing data store 120. As described herein, the orders may be defined, at least in part, by one or more tech packs 180 received from the client devices 160. At reference numeral 704, the process includes the order aggregator and organizer 210 aggregating the orders for textile products over time. By aggregating orders from various geographic locations and coordinating apparel assembly processes on a relatively large scale, increased efficiency in apparel manufacturing can be achieved.

At reference numeral 706, the process includes the panel arranger 212 arranging panels 192 for textile products into one or more of the aggregated textile panel templates 190. The panels 192 in the aggregated textile panel templates 190 can be representative of one or more sections, portions, or pieces of fabric or other materials for one or more shirts, pants, dresses, or other accessories or items to be manufactured. In one embodiment, when arranging the panels 192, the panel arranger 212 is configured to align the panels 192 to the extent possible among each other to reduce scrap in textile sheets as described herein. Additionally or alternatively, the panel arranger 212 can orient the panels 192 in the textile panel templates 190 to align them with a thread, weave, nap, knit, or print pattern(s) in textile sheets.

At reference numeral 708, the process includes the assembly engine 136 developing one or more assembly schemes 194 for the orders of textile products received at reference numeral 702. The process further includes the assembly notation generator 236 incorporating the assembly notations 196 into the textile panel templates 190 as described herein. The development of the assembly schemes 194 and incorporation of the assembly notations 196 is described in further detail below with reference to FIG. 8.

At reference numeral 710, the process includes the print engine 132 instructing the textile printer 172 to print the panels 192 for textile products onto one or more textile sheets. Particularly, the process includes the print instructor 214 generating instructions with reference to one or more of the textile panel templates 190 and forwarding those instructions to the textile printer 172. In turn, the textile printer 172 prints the panels 192 for the orders of textile products received at reference numeral 702, along with the assembly notations 196. As described herein, the assembly notations 196 can include seam notations, stitch notations, alignment marks, and machine-readable identifiers, for example, among other assembly instructions, notations, references, etc. At reference numeral 710, the process also includes the print instructor 214 coordinating the printing operations of the textile printer 172 over the network 150. In that context, the print instructor 214 can monitor the ongoing printing operations of the textile printer 172 to coordinate those operations with cutting and/or assembly processes, for example.

At reference numeral 712, the process includes the cut engine 134 generating cut control instructions for the textile cutter 176 to cut out the panels 192 printed at reference numeral 710. Further, at reference numeral 714, the process includes the cut engine 134 instructing the textile cutter 176 to cut the plurality of panels 192 out from the textile sheets. Examples of the generation of the cut control instructions and the control of the textile cutter 176 by the cut engine 134 are described in further detail in the '840 application.

At reference numeral 716, the process includes the assembly engine 136 requisitioning one or more totes in the textile production line 178 based in part on the assembly scheme developed at reference numeral 708. For example, depending upon the type of the orders being processed, the assembly scheme developer 230 may need to requisition one or more totes 520 in the textile production line 178 to transfer cut-out panels to one or more of the assembly stations 530. Thus, at reference numeral 716, the assembly engine 136 identifies a number of totes 520 that are needed and available in the textile production line 178.

At reference numeral 718, the process includes the assembly engine 136 instructing a transfer of the cut-out panels into one or more of the totes 520 requisitioned at reference numeral 716. The cut-out panels may be transferred from the textile cutter 176 into the totes 520 of the textile production line 178 using gravity chutes, intermediary conveyors, a transfer arm, or other mechanisms by the direction of the production line coordinator 232 of the assembly engine 136. In other embodiments, the cut-out panels can be placed into the totes transfer arm or another automated fabric picker as described in the '840 Application and/or the '849 Application.

At reference numeral 720, the process includes the assembly engine 136 directing the totes 520 to one or more of the assembly stations 530 of the textile production line 178 based on the assembly scheme 194 developed at reference numeral 708. For example, if one item, such as a dress, is being assembled for an order, the assembly engine 136 can generate instructions to place all panels for the dress into one tote 520 and direct the tote 520 along the textile production line 178 to a single assembly station 530 for assembly. Alternatively, if several jackets are being assembled, the assembly engine 136 can generate instructions to place several panel-pairs (i.e., panels that are to be directly sewn together) into a tote 520 and direct the tote 520 along the conveyor system to a single assembly station 530 for assembly. At the assembly station 530, a sewing worker and/or automated sewing machine can assemble each of the panel-pairs, and the assembly engine 136 can generate further instructions to direct the assembled panel-pairs to another assembly station 530 for additional steps in the assembly of the jackets.

At reference numeral 722, the process includes the computing environment 110 generating a display of assembly instructions. For example, the computing environment 110 can generate the display 600 to be rendered on a display screen at one of the assembly stations 530 using a network page provided over the network 150. Here, the textile products for the orders received at reference numeral 702 can be assembled. As described herein, the orders can be assembled into finished textile products with reference to the display 600 and the assembly notations 196.

At reference numeral 724, the process includes the assembly engine 136 directing one or more totes 520 including finished, assembled textile products to one or more QC, photography, binning, and/or packing stations. Thus, the assembled textile products can be checked for quality control, photographed for placement in an electronic commerce system, stored in a materials handling area/facility, packaged for shipping, etc.

Figure 8:
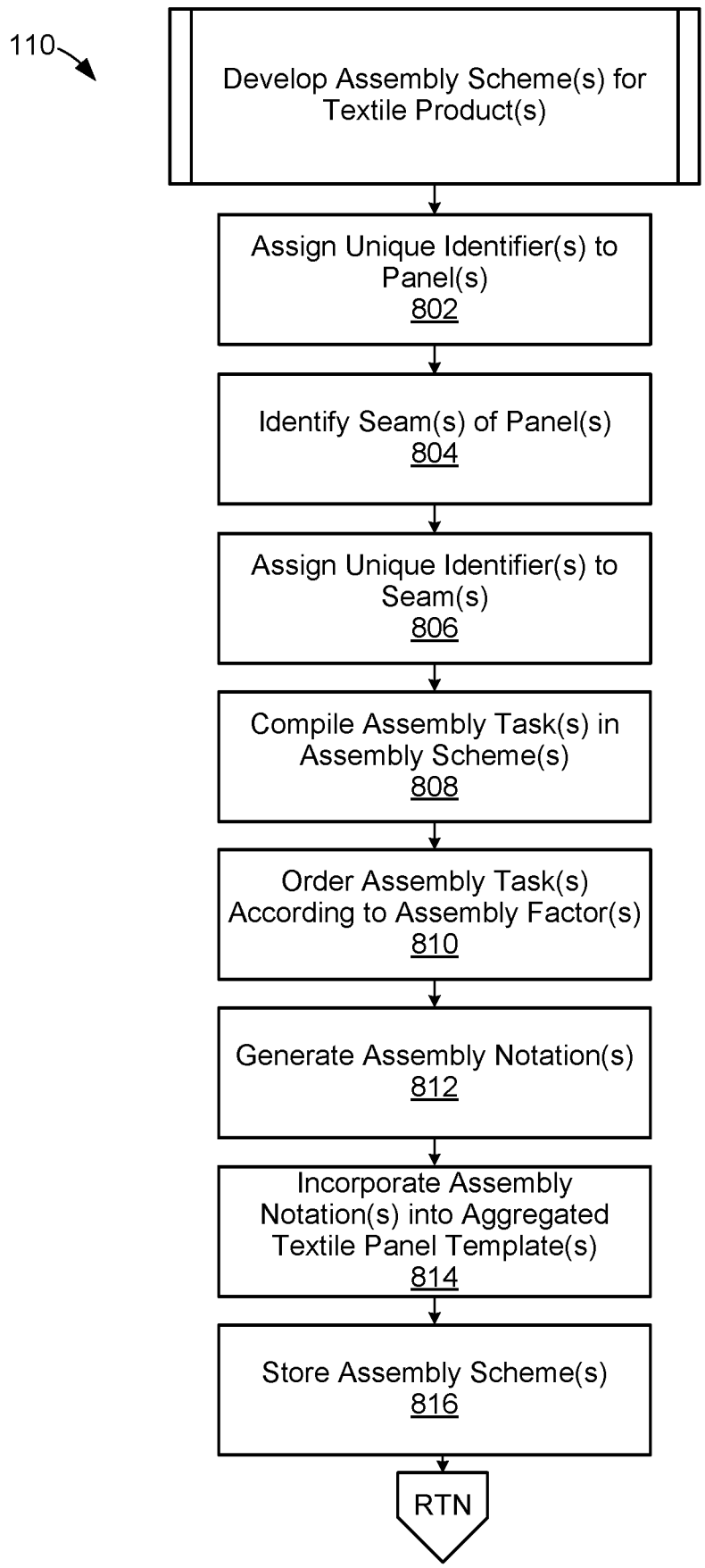
FIG. 8 illustrates an example assembly scheme development process used in the assembly instruction printing and referencing process in FIGS. 7A and 7B according to various embodiments of the present disclosure.

FIG. 8 illustrates a more detailed example of the assembly scheme development process from reference numeral 708 in FIG. 7A. At reference numeral 802, the process includes the print engine 132 assigning a unique identifier to one or more of the panels 192 in the textile panel templates 190. For example, the panel arranger 212 of the print engine 132 can assign unique identifiers for the panels 192 and store those identifiers in the panel database 126 for reference by the computing environment 110.

At reference numeral 804, the process includes the assembly scheme developer 230 identifying one or more seams of the panels 192 in the textile panel templates 190. The seams can be identified with reference to assembly information in the tech packs 180, for example, and/or the edges of the panels 192. At reference numeral 806, the process includes the assembly scheme developer 230 assigning unique identifiers to the seams identified at reference numeral 804. Using the unique identifiers, the assembly scheme developer 230 can generate assembly instructions that specifically identify the seams, and those seams can be associated with the seam notations 631-633 and identified in the seam identifier 654 column of the table 650.

At reference numeral 808, the process includes compiling, by the task compiler 234, assembly tasks to assemble the textile products in the orders received at reference numeral 702. The assembly tasks can include seaming tasks, hemming tasks, fastener (e.g., button, zipper, etc.) attachment tasks, and other tasks required for the assembly of textile products. Further, the task complier 234 can recognize variations of the same type of task, such as different types of stitch classes, seam allowances, and thread colors for seam stitching tasks. As the task complier 234 compiles the list of assembly tasks, it can also assign unique tasks identifiers to each of the tasks and store those unique task identifiers in the apparel manufacturing data store 120. Generally, the assembly tasks are those tasks which, when followed by a sewing worker, result in the assembly (or partial assembly) of the textile product.

The assembly tasks can be compiled based on assembly specification information contained in the tech packs 180. However, the task compiler 234 can also determine assembly tasks, or aspects of assembly tasks, even without any specification of those tasks in the tech packs 180. For example, a tech pack 180 may designate sewing a seam along edges of certain panels in a textile product, but not the type and/or color of the thread to be used to stitch those seams together. In that case, the task compiler 234 can determine an appropriate type of thread and color of thread to be used.

At reference numeral 810, the process includes the task complier 234 ordering the assembly tasks compiled at reference numeral 808 into an ordered set of assembly tasks. In various examples, the order of the assembly tasks can be set according to instructions defined in the tech packs 180 or determined, at least in part, directly by the task complier 234. The task complier 234 can order the assembly tasks based on one or more assembly factors, such as assembly factors that impact the efficiency of the tasks, the quality of the finished product, or the manner in which human or capital resources are utilized in the textile assembly production line. For example, the order of stitching seams in a textile product can be selected to make the overall assembly process simpler for sewing workers, to increase efficiency, to ensure quality, or to avoid mistakes.

At reference numeral 812, the process includes the assembly notation generator 236 generating a set of assembly notations, such as the assembly notations 196, based on the assembly tasks and the order of the assembly tasks determined at reference numerals 808 and 810. For example, the assembly notations 196 can designate various seams, types of stitching, stitch start markers, stitch end markers, assembly alignment markers, and other instructions such as those illustrated in the display 600 in FIG. 6. The assembly notations 196 can also include machine-readable representations of unique panel identifiers, unique seam identifiers, and/or particular assembly tasks. As described herein, the assembly notations 196 can make use of different colors according to the assembly notation syntax, where the colors can indicate various tasks and/or an order of those tasks. The assembly notations 196 can also be generated using certain assembly notation symbols, letters, numbers, and/or colors to designate various tasks and/or an order of those tasks according to the assembly notation syntax.

At reference numeral 814, the process includes the assembly notation generator 236 incorporating the assembly notations into one or more textile panel templates, such as the textile panel templates 190. When incorporating the assembly notations 196 into the textile panel templates 190, the assembly notation generator 236 can identify appropriate or preferred locations to insert each assembly notation 196. For example, stitch start markers can be inserted at locations where seam stitching tasks begin, and stitch end markers can be inserted at locations where seam stitching tasks end. As another factor, the locations can be selected so that the assembly notations 196 will be inconspicuous or hidden in textile products, once assembled. To that end, the assembly notation generator 236 can locate one or more of assembly notations 196 on a back or opposite side of a textile sheet from that used to print patterns for the panels 192.

At reference numeral 816, the process includes the assembly engine 136 storing the assembly scheme developed in FIG. 8 into the assembly scheme database 126 of the apparel manufacturing data store 120. Once stored in the apparel manufacturing data store 120, the computing environment 110 can refer to data stored in the apparel manufacturing data store 120 to render a network page for display of assembly instructions, such as the display 600 in FIG. 6, as described herein. Thus, according to aspects of the embodiments, sewing workers can refer to assembly notations printed onto cut-out panels for textile products to determine how the textile products should be assembled. Further, the sewing workers can refer to a display that provides additional details related to the assembly tasks for the textile products.

Figure 9:
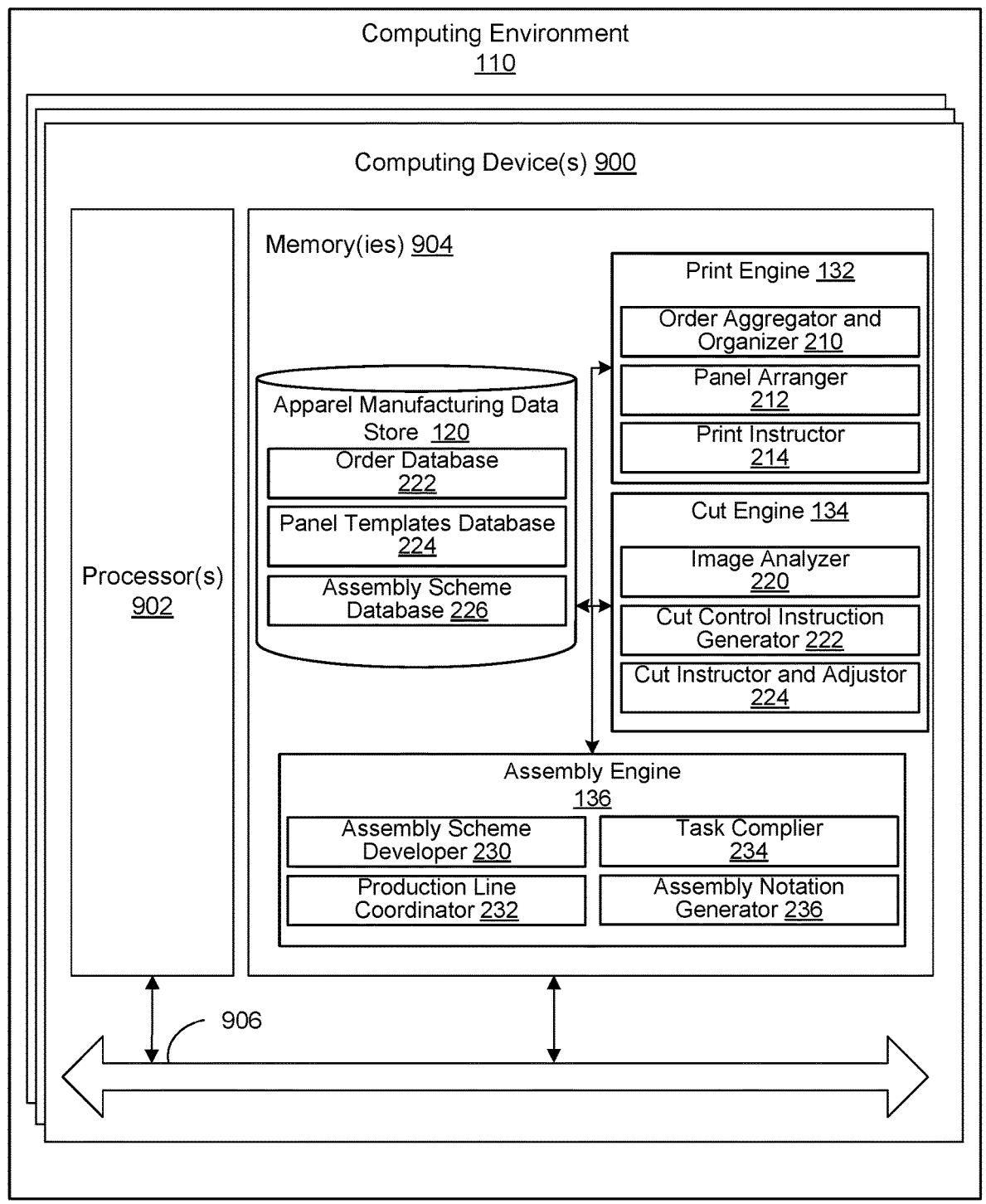
FIG. 9 illustrates an example schematic block diagram of the computing environment employed in the networked environment shown in FIG. 2 according to various embodiments of the present disclosure.

FIG. 9 illustrates an example schematic block diagram of the computing environment 110 employed in the networked environment 100 in FIGS. 1 and 2 according to various embodiments of the present disclosure. The computing environment 110 includes one or more computing devices 900. Each computing device 900 includes at least one processing system, for example, having a processor 902 and a memory 904, both of which are electrically and communicatively coupled to a local interface 906. To this end, each computing device 900 can be embodied as, for example, at least one server computer or similar device. The local interface 906 can be embodied as, for example, a data bus with an accompanying address/control bus or other bus structure as can be appreciated.

In various embodiments, the memory 904 stores data and software or executable-code components executable by the processor 902. For example, the memory 904 can store executable-code components associated with the print engine 132, cut engine 134 and assembly engine 136 for execution by the processor 902. The memory 904 can also store data such as that stored in the apparel manufacturing data store 120, among other data.

It should be understood and appreciated that the memory 904 can store other executable-code components for execution by the processor 902. For example, an operating system can be stored in the memory 904 for execution by the processor 902. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 904 stores software for execution by the processor 902. In this respect, the terms "executable" or "for execution" refer to software forms that can ultimately be run or executed by the processor 902, whether in source, object, machine, or other form. Examples of executable programs include, for example, a compiled program that can be translated into a machine code format and loaded into a random access portion of the memory 904 and executed by the processor 902, source code that can be expressed in an object code format and loaded into a random access portion of the memory 904 and executed by the processor 902, or source code that can be interpreted by another executable program to generate instructions in a random access portion of the memory 904 and executed by the processor 902, etc. An executable program can be stored in any portion or component of the memory 904 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 904 can include both volatile and nonvolatile memory and data storage components. Volatile components are those that do not retain data values upon loss of power. Nonvolatile components are those that retain data upon a loss of power. Thus, the memory 904 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

Also, the processor 902 may represent multiple processors 902 and/or multiple processor cores and the memory 904 may represent multiple memories that operate in parallel, respectively, or in combination. Thus, the local interface 906 can be an appropriate network or bus that facilitates communication between any two of the multiple processors 902, between any processor 902 and any of the memories 904, or between any two of the memories 904, etc. The local interface 906 can include additional systems designed to coordinate this communication, including, for example, a load balancer that performs load balancing. The processor 902 can be of electrical or of some other available construction.

As discussed above, the print engine 132, the cut engine 134, and the assembly engine 136 may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts or process diagrams of FIGS. 7A, 7B, and 8 are representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 902. The machine code can be converted from the source code, etc. Further, each block may represent, or be connected with, a circuit or a number of interconnected circuits to implement a certain logical function or process step.

Although the flowcharts or process diagrams of FIGS. 7A, 7B, and 8 illustrate a specific order, it is understood that the order can differ from that which is depicted. For example, an order of execution of two or more blocks can be scrambled relative to the order shown. Also, two or more blocks shown in succession in FIGS. 7A, 7B, and 8 can be executed concurrently or with partial concurrence. Further, in some embodiments, one or more of the blocks shown in FIGS. 7A, 7B, and 8 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the print engine 132, the cut engine 134, and the assembly engine 136 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system can be directed by execution of the instructions to perform certain processes such as those illustrated in FIGS. 7A, 7B, and 8. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
    at least one computing device communicatively coupled to a textile printer over a network and configured to perform a method comprising:
        receiving, by the at least one computing device, an order to purchase a textile product having a plurality of panels defined in a tech pack;
        arranging, by the at least one computing device, the plurality of panels for the textile product into a textile panel template;
        identifying, by the at least one computing device, a plurality of seams among the plurality of panels in the textile product with reference to the tech pack;
        compiling, by the at least one computing device, a plurality of assembly tasks in an assembly scheme to assemble the textile product using at least one of the plurality of seams in the textile product;
        ordering, by the at least one computing device, the plurality of assembly tasks into an ordered set of assembly tasks according to at least one assembly factor;
        generating, by the at least one computing device, a set of assembly notations to print on a textile sheet based at least in part on the ordered set of assembly tasks and an assembly notation syntax;
        incorporating, by the at least one computing device, the set of assembly notations and a machine-readable representation of a unique task identifier into the textile panel template, wherein the unique task identifier is associated with an assembly task of the plurality of assembly tasks and a first panel of the plurality of panels, and wherein an assembly notation of the set of assembly notations is associated with the assembly task and the first panel, and wherein the unique task identifier is located between an edge of the first panel and the assembly notation;
        instructing, by the at least one computing device, the textile printer to print the textile panel template including the set of assembly notations and the machine-readable representation onto the textile sheet; and
        rendering, by the at least one computing device, a network page that displays at least one of the plurality of assembly tasks in response to a query of a database using the machine-readable representation.

2. The system of claim 1, wherein the method further comprises:
    assigning, by the at least one computing device, a unique panel identifier to a panel among the plurality of panels; and assigning, by the at least one computing device, a unique seam identifier to a seam among the plurality of seams.

3. The system of claim 2, wherein the method further comprises:

storing, by the at least one computing device, the unique panel identifier, the unique seam identifier, the plurality of assembly tasks, and the set of assembly notations in the database associated with the textile product.

4. A method, comprising:

arranging, by at least one computing device, a plurality of panels for a textile product into a textile panel template;

identifying, by the at least one computing device, a plurality of seams among the plurality of panels in the textile product;

compiling, by the at least one computing device, a plurality of assembly tasks in an assembly scheme to assemble the textile product using at least one of the plurality of seams in the textile product;

generating, by the at least one computing device, a set of assembly notations to print on a textile sheet based at least in part on the plurality of assembly tasks;

incorporating, by the at least one computing device, the set of assembly notations and a machine-readable representation of a unique task identifier into the textile panel template, wherein the unique task identifier is associated with an assembly task of the plurality of assembly tasks and a first panel of the plurality of panels, and wherein an assembly notation of the set of assembly notations is associated with the assembly task and associated with the first panel, wherein the unique task identifier is located between an edge of the first panel and the assembly notation;

instructing, by the at least one computing device, a textile printer to print the textile panel template including the set of assembly notations and the machine-readable representation onto the textile sheet; and rendering, by the at least one computing device, a network page that displays at least one of the plurality of assembly tasks in response to a query of a database using the machine-readable representation.

5. The method of claim 4, wherein generating the set of assembly notations comprises generating, by the at least one computing device, the set of assembly notations based further in part on an assembly notation syntax.

6. The method of claim 4, wherein the set of assembly notations comprises at least one of an assembly sequence identifier, a stitch start marker, a stitch end marker, an assembly instruction block, or an assembly alignment marker.

7. The method of claim 4, further comprising ordering, by the at least one computing device, the plurality of assembly tasks into an ordered set of assembly tasks according to at least one assembly factor.

8. The method of claim 4, wherein the set of assembly notations are embodied using notations of different colors for printing on the textile sheet according to an assembly notation syntax.

9. The method of claim 8, wherein, according to the assembly notation syntax, the different colors define a sequence of the plurality of assembly tasks.

10. The method of claim 8, wherein, according to the assembly notation syntax, each of the different colors defines a type of task among the plurality of assembly tasks.

11. The method of claim 4, further comprising:

assigning, by the at least one computing device, a unique panel identifier to a panel among the plurality of panels;

assigning, by the at least one computing device, a unique seam identifier to a seam among the plurality of seams; and storing the assembly scheme, including the unique panel identifier, the unique seam identifier, the plurality of assembly tasks, and the set of assembly notations in the database associated with the textile product.

12. The method of claim 11, wherein the machine-readable representation is a first machine-readable representation, and wherein the method further comprises incorporating, by the at least one computing device, a second machine-readable representation of at least one of the unique panel identifier or the unique seam identifier into the textile panel template.

13. The method of claim 4, further comprising selecting, by the at least one computing device, a location to insert at least one assembly notation in the textile panel template based at least in part upon respective locations of the plurality of panels in the textile panel template.

14. A method, comprising:

compiling, by at least one computing device, a plurality of assembly tasks in an assembly scheme to assemble a textile product;

generating, by the at least one computing device, a set of assembly notations to print on a textile sheet based at least in part on the plurality of assembly tasks and an assembly notation syntax;

incorporating, by the at least one computing device, the set of assembly notations and a machine-readable representation of a unique task identifier into a template for printing on the textile sheet, wherein the unique task identifier is associated with an assembly task of the plurality of assembly tasks and a first panel of the plurality of panels, and wherein an assembly notation of the set of assembly notations is associated with the assembly task and the first panel, wherein the unique task identifier is located between an edge of the first panel and the assembly notation;

storing, by the at least one computing device, the machine-readable representation in a database associated with the textile product; and in response to a query of the database using the machine-readable representation, rendering, by the at least one computing device, a network page for display of the plurality of panels of the textile product along with at least one of the plurality of assembly tasks.

15. The method of claim 14, further comprising instructing, by the at least one computing device, a textile printer to print the template onto the textile sheet.

16. The method of claim 14, further comprising ordering, by the at least one computing device, the plurality of assembly tasks into an ordered set of assembly tasks according to at least one assembly factor.

17. The method of claim 16, wherein the set of assembly notations are generated based at least in part on the ordered set of assembly tasks and an assembly notation syntax.

18. The method of claim 14, wherein the set of assembly notations comprises at least one of an assembly sequence identifier, a stitch start marker, a stitch end marker, an assembly instruction block, or an assembly alignment marker.

19. The method of claim 14, further comprising selecting, by the at least one computing device, a location to insert at least one assembly notation in the template based at least in part upon respective locations of the plurality of panels of the textile product in the template.

* * * * *